US012651260B2

(12) United States Patent
Kruse et al.

(10) Patent No.: US 12,651,260 B2
(45) Date of Patent: *Jun. 9, 2026

(54) SYSTEMS AND METHODS FOR AUTOMATICALLY SECURING AND VALIDATING MULTI-SERVER ELECTRONIC COMMUNICATIONS OVER A PLURALITY OF NETWORKS

(71) Applicant: Lithic, Inc., New York, NY (US)

(72) Inventors: Jason Kruse, Brooklyn, NY (US);
Boling Jiang, Brooklyn, NY (US);
Andrew Roth, Scarsdale, NY (US)

(73) Assignee: Lithic, Inc., New York, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/449,481

(22) Filed: Aug. 14, 2023

(65) Prior Publication Data

US 2023/0401579 A1     Dec. 14, 2023

Related U.S. Application Data

(60) Continuation of application No. 17/689,561, filed on Mar. 8, 2022, now Pat. No. 11,741,468, which is a
(Continued)

(51) Int. Cl.
*G06Q 20/40*      (2012.01)
*H04L 9/14*       (2006.01)
(Continued)

(52) U.S. Cl.
CPC ............. *G06Q 20/401* (2013.01); *H04L 9/14* (2013.01); *H04L 9/30* (2013.01); *H04L 9/3247* (2013.01);
(Continued)

(58) Field of Classification Search
None
See application file for complete search history.

(56) References Cited

U.S. PATENT DOCUMENTS 6,029,890 A      2/2000  Austin
6,315,193 B1    11/2001  Hogan
(Continued)

FOREIGN PATENT DOCUMENTS

| WO | WO 2014080167 A1 | 5/2014 |
| WO | WO 2014184771 A1 | 11/2014 |
| WO | WO 2016050990 A1 | 4/2016 |

OTHER PUBLICATIONS

International Search Report and Written Opinion mailed Dec. 13, 2016, for International Application No. PCTUS2016051086, 14 pages.

(Continued)

*Primary Examiner* — Jamie R Kucab
(74) *Attorney, Agent, or Firm* — Baker Botts L.L.P.

(57) ABSTRACT

In one embodiment, a method includes transmitting, by a privacy component, to a first server, a privacy communication request consisting of device data and server data associated with a second server, receiving, by the privacy component, from the first server, a privacy communication string tagged to the second server, wherein the privacy communication string and a privacy communication string record are generated in response to the privacy communication request identifying the second server based on the server data, transmitting, by the privacy component to the second server the privacy communication string, configured to be transmitted to the first server as an approval request, identifying the second server as a requesting server associated with the secure exchange, and receiving, by the privacy component, from the second server, an indication that the (Continued)

approval request was validated based on the requesting server matching the second server identified in the privacy communication string record.

20 Claims, 16 Drawing Sheets

Related U.S. Application Data continuation of application No. 17/226,881, filed on Apr. 9, 2021, now Pat. No. 11,276,061, which is a division of application No. 15/261,368, filed on Sep. 9, 2016, now Pat. No. 11,004,071.

(60) Provisional application No. 62/216,219, filed on Sep. 9, 2015.

(51) Int. Cl.
| | |
|---|---|
| *H04L 9/30* | (2006.01) |
| *H04L 9/32* | (2006.01) |
| *H04L 9/40* | (2022.01) |

(52) U.S. Cl.
CPC ...... *H04L 63/0442* (2013.01); *H04L 63/0407* (2013.01); *H04L 63/06* (2013.01); *H04L 2209/56* (2013.01)

(56) References Cited

U.S. PATENT DOCUMENTS

| | | |
|---|---|---|
| 6,636,833 B1 | 10/2003 | Flitcroft |
| 6,793,131 B2 | 9/2004 | Hogan |
| 7,136,835 B1 | 11/2006 | Flitcroft |
| 7,359,880 B2 | 4/2008 | Abel |
| 7,379,919 B2 | 5/2008 | Hogan |
| 7,433,845 B1 | 10/2008 | Flitcroft |
| 7,567,934 B2 | 7/2009 | Flitcroft |
| 7,571,142 B1 | 8/2009 | Flitcroft |
| 7,593,896 B1 | 9/2009 | Flitcroft |
| 7,783,569 B2 | 8/2010 | Abel |
| 7,895,122 B2 | 2/2011 | Flitcroft |
| 8,229,854 B2 | 7/2012 | Stephen |
| 8,321,315 B2 | 11/2012 | Abel |
| 8,510,218 B2 | 8/2013 | Abel |
| 8,527,416 B2 | 9/2013 | Flitcroft |
| 8,548,926 B2 | 10/2013 | Balistierri |
| 8,639,623 B2 | 1/2014 | Kavanagh |
| 8,676,707 B2 | 3/2014 | Flitcroft |
| 8,751,381 B2 | 6/2014 | Musser |
| 8,756,150 B2 | 6/2014 | Flitcroft |
| 8,775,318 B2 | 7/2014 | Lee |
| 8,799,153 B2 | 8/2014 | White |
| 8,812,402 B2 | 8/2014 | Evans |
| 8,965,811 B2 | 2/2015 | Wankmueller |
| 10,614,454 B1 | 4/2020 | Brooks |
| 10,692,156 B2 | 6/2020 | Skala |
| 11,004,071 B2 | 5/2021 | Kruse |
| 11,010,731 B1 | 5/2021 | Mcginlay |
| 11,100,511 B1 | 8/2021 | Rule |
| 11,257,085 B1 | 2/2022 | Barkas |
| 11,276,061 B2 | 3/2022 | Kruse |
| 11,405,189 B1 | 8/2022 | Bennison |
| 11,423,374 B2 | 8/2022 | Hardin |
| 11,423,400 B1 | 8/2022 | Hutchison |
| 11,546,345 B2 | 1/2023 | D'Agostino |
| 11,568,406 B2 | 1/2023 | Kruse |
| 11,699,154 B2 | 7/2023 | Kruse |
| 11,741,468 B2 | 8/2023 | Kruse |
| 11,741,469 B2 | 8/2023 | Kruse |
| 11,775,977 B1 | 10/2023 | Kruse |
| 2003/0028481 A1 | 2/2003 | Flitcroft |
| 2005/0038721 A1 | 2/2005 | Goeckel |
| 2006/0124756 A1 | 6/2006 | Brown |
| 2006/0249574 A1 | 11/2006 | Brown |
| 2007/0156579 A1 | 7/2007 | Manesh |
| 2008/0120238 A1 | 5/2008 | Flitcroft |
| 2008/0177660 A1 | 7/2008 | Abel |
| 2008/0249926 A1 | 10/2008 | Sgaraglio |
| 2008/0288405 A1 | 11/2008 | John |
| 2009/0030747 A1 | 1/2009 | Smith |
| 2009/0119190 A1 | 5/2009 | Realini |
| 2010/0088237 A1 | 4/2010 | Wankmueller |
| 2011/0125642 A1 | 5/2011 | Kamal |
| 2012/0011063 A1 | 1/2012 | Killian |
| 2012/0215688 A1 | 8/2012 | Musser |
| 2013/0218769 A1 | 8/2013 | Pourfallah |
| 2013/0232035 A1 | 9/2013 | Stijen |
| 2013/0290121 A1 | 10/2013 | Simakov |
| 2013/0339167 A1 | 12/2013 | Taylor |
| 2013/0346302 A1* | 12/2013 | Purves ................. G06Q 20/102 |
| | | 705/40 |
| 2013/0346305 A1 | 12/2013 | Mendes |
| 2014/0058855 A1 | 2/2014 | Hussein |
| 2014/0074637 A1* | 3/2014 | Hammad ............. G06Q 20/326 |
| | | 705/41 |
| 2014/0108172 A1 | 4/2014 | Weber |
| 2014/0297533 A1 | 10/2014 | Mittal |
| 2014/0379562 A1 | 12/2014 | Olson |
| 2015/0012430 A1 | 1/2015 | Chisholm |
| 2015/0254672 A1* | 9/2015 | Huesch ................. G06Q 20/306 |
| | | 705/44 |
| 2016/0071069 A1 | 3/2016 | Skala |
| 2016/0071074 A1 | 3/2016 | Baird |
| 2016/0260169 A1 | 9/2016 | Arnold |
| 2017/0061531 A1 | 3/2017 | Smith |
| 2017/0070484 A1 | 3/2017 | Kruse |
| 2017/0161727 A1 | 6/2017 | Gupta |
| 2018/0075525 A1 | 3/2018 | Qin |
| 2018/0108008 A1 | 4/2018 | Chumbley |
| 2018/0121891 A1 | 5/2018 | Hosny |
| 2018/0121895 A1 | 5/2018 | Mohrlock |
| 2018/0124596 A1 | 5/2018 | Iannace |
| 2018/0174137 A1 | 6/2018 | Subbarayan |
| 2018/0253727 A1 | 9/2018 | Ortiz |
| 2018/0268461 A1 | 9/2018 | Hoag |
| 2018/0300730 A1 | 10/2018 | Telford-Reed |
| 2019/0065585 A1 | 2/2019 | Goenka |
| 2019/0068608 A1 | 2/2019 | Boland |
| 2019/0095989 A1 | 3/2019 | Archer |
| 2019/0122207 A1 | 4/2019 | Musser |
| 2020/0005290 A1 | 1/2020 | Madisetti |
| 2020/0019964 A1 | 1/2020 | Miller |
| 2020/0058032 A1 | 2/2020 | Lad |
| 2020/0058068 A1 | 2/2020 | Gandhi |
| 2020/0112585 A1 | 4/2020 | Keohane |
| 2020/0193443 A1 | 6/2020 | Piel |
| 2020/0211124 A1 | 7/2020 | Bhagat |
| 2020/0250694 A1 | 8/2020 | Mock |
| 2020/0267153 A1 | 8/2020 | Kang |
| 2020/0294106 A1 | 9/2020 | Seshan |
| 2020/0311727 A1 | 10/2020 | Loomis |
| 2020/0349573 A1 | 11/2020 | Dong |
| 2021/0004801 A1 | 1/2021 | Barnum |
| 2021/0004880 A1 | 1/2021 | Benkreira |
| 2021/0012339 A1 | 1/2021 | Rafferty |
| 2021/0133741 A1 | 5/2021 | Spiegel |
| 2021/0201296 A1 | 7/2021 | Rule |
| 2021/0233070 A1 | 7/2021 | Malene |
| 2021/0304287 A1 | 9/2021 | Hoag |
| 2021/0326818 A1 | 10/2021 | Hogg |
| 2021/0344660 A1 | 11/2021 | Benkreira |
| 2021/0350382 A1 | 11/2021 | Lopes |
| 2021/0383378 A1 | 12/2021 | Mccoy |
| 2022/0005022 A1 | 1/2022 | Tu |
| 2022/0027871 A1 | 1/2022 | Farooq |
| 2022/0058617 A1 | 2/2022 | Tibrewala |
| 2022/0180357 A1 | 6/2022 | Chattopadhyay |
| 2022/0198453 A1 | 6/2022 | Kruse |
| 2022/0207531 A1 | 6/2022 | Kruse |
| 2022/0222666 A1 | 7/2022 | Kruse |
| 2022/0261795 A1 | 8/2022 | Perkins |
| 2022/0261803 A1 | 8/2022 | Kruse |

(56) References Cited

U.S. PATENT DOCUMENTS

| | | | |
|---|---|---|---|
| 2022/0261814 A1 | 8/2022 | Smith | |
| 2022/0366411 A1 | 11/2022 | Bajwa | |
| 2022/0405753 A1 | 12/2022 | Lee | |
| 2024/0013168 A1 | 1/2024 | Oei | |
| 2024/0013177 A1 | 1/2024 | Sindi | |
| 2024/0013221 A1 | 1/2024 | Kruse | |
| 2024/0202681 A1 | 6/2024 | Kachhadiya | |

OTHER PUBLICATIONS

Marcel J. Mampaey, "Secure Remittance Transaction to Bankless Consumers in a Fragmented Applications Market", Bell Labs Technical Journal, 16(2):219-234 (2011), downloaded on Aug. 27, 2022.

* cited by examiner

100

Tag Verification 300

Example Data Flow: Privacy purchase platform (P3) initiation and validation

Create an Account

We're currently only available in the US
You'll need an Early Access Code to signup.

EMAIL

PASSWORD
Something Secure           ◯

EARLY ACCESS CODE
XXXXX

By signing up, you agree to the terms.  ( CREATE ACCOUNT )

400a

Nice to Meet You

Please ensure this information is accurate.
We're required to verify this information against public
records. But don't worry we'll keep it private.

| FIRST NAME<br>John | LAST NAME<br>Smith |
|---|---|
| STREET ADDRESS<br>123 Street | APT OR SUITE (OPTIONAL)<br>1A |
| ZIP CODE  FIVE DIGITS<br>11111 | DATE OF BIRTH  MM/DD/YYYY<br>MM/DD/YYYY |
|  | ( BACK )  ( NEXT ) |

Checkout Detection GUI 500

Contextually aware single-click checkout button

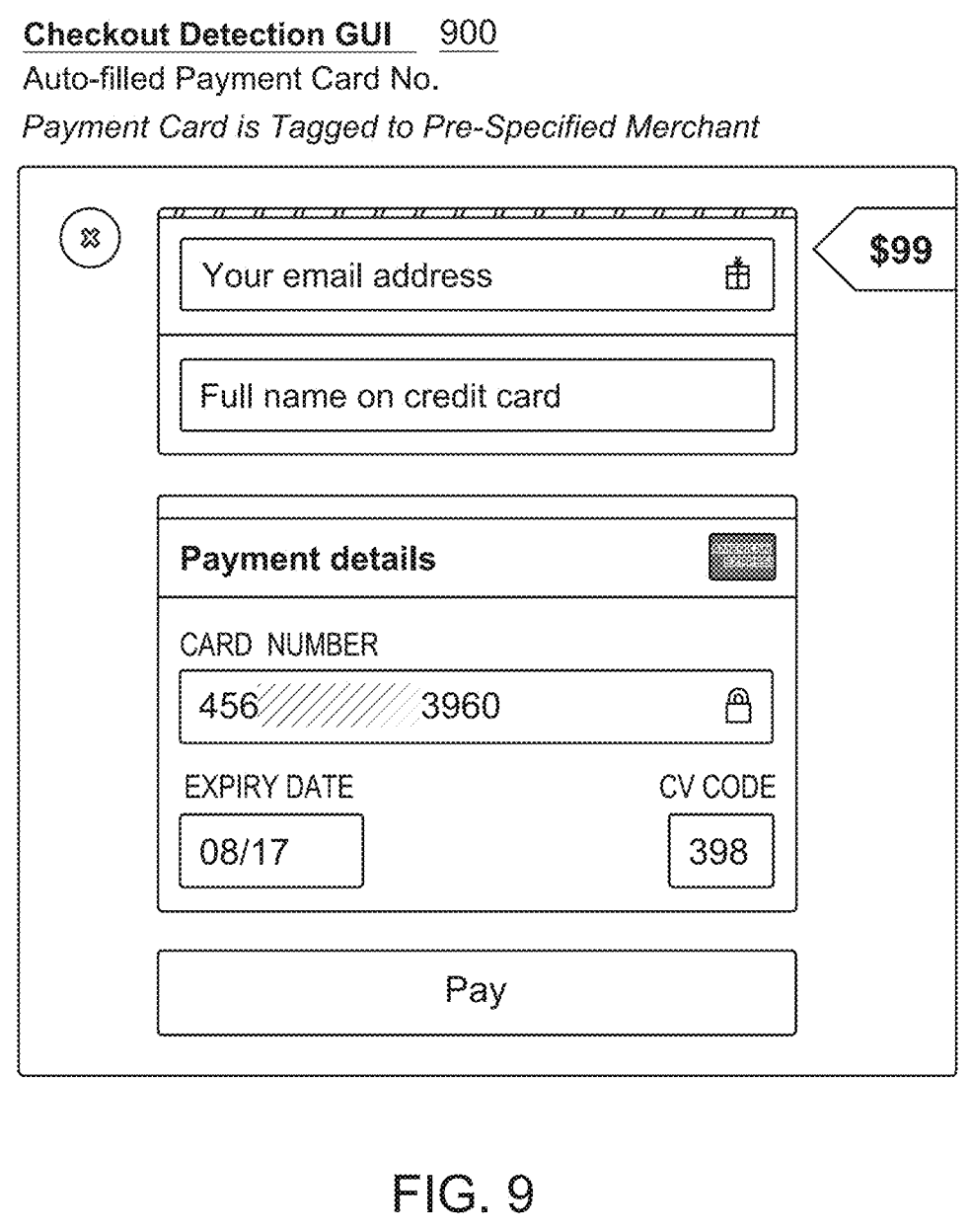

Checkout Detection GUI    900
Auto-filled Payment Card No.
*Payment Card is Tagged to Pre-Specified Merchant*

Your email address

Full name on credit card

Payment details

CARD  NUMBER

456//////3960

EXPIRY DATE                    CV CODE

08/17                              398

$99

Pay

FIG. 9

SYSTEMS AND METHODS FOR AUTOMATICALLY SECURING AND VALIDATING MULTI-SERVER ELECTRONIC COMMUNICATIONS OVER A PLURALITY OF NETWORKS

PRIORITY

This application is a continuation under 35 U.S.C. § 120 of U.S. patent application Ser. No. 17/689,561, filed 8 Mar. 2022, which is a continuation under 35 U.S.C. § 120 of U.S. patent application Ser. No. 17/226,881, filed 9 Apr. 2021, issued as U.S. patent Ser. No. 11/276,061, which is a divisional under 35 U.S.C. § 121 of U.S. patent application Ser. No. 15/261,368, filed 9 Sep. 2016, issued as U.S. patent Ser. No. 11/004,071, which claims the benefit under 35 U.S.C. § 119(e) of U.S. Provisional Patent Application No. 62/216,219, filed 9 Sep. 2015, each of which are incorporated herein by reference.

COPYRIGHT

TECHNICAL FIELD

The present disclosure relates to secure communication of information. In particular, but not by way of limitation, the present disclosure relates to systems and methods for automatically securing and validating multi-server electronic communications and data exchanges over a plurality of networks.

BACKGROUND

As awareness of the security and privacy concerns associated with conducting online communications increases, it is evident that a large number of unsophisticated entities that conduct communications online are susceptible to attack from bad actors, like computer hackers. An increasing number of entities are being compromised, leading to data breaches and exposure of consumer data. Websites, services, and merchants access and store critical consumer data, and so data breaches resulting from, for example, a merchant's poor, incomplete, or non-existent security practices, allows sensitive consumer data to be available and distributed to anyone who cares to exploit that data.

SUMMARY OF PARTICULAR EMBODIMENTS

This disclosure relates to methods and systems for automatically securing and validating multi-server electronic communications over a plurality of networks, without requiring additional physical or programmatic infrastructure on the intermediary servers/entities. In one embodiment, a processor-executable component can be transmitted from a first server to a compute device, where it generates a pair of asymmetric cryptographic parameters. The first server uses one of those parameters to verify subsequent communications from the component and respond with tagged privacy communication strings, which the component can provide to a second server as part of a secure communication data exchange. The first server can then receive a secure communication data exchange approval request from a third server, and analyzes the request to determine a validity metric. If the validity metric meets a specified threshold, the first server transmits a validation of the secure communication data exchange approval request to complete a data exchange between the compute device and the second server.

Also disclosed is a system for securing and validating multi-server electronic communications over a plurality of networks, comprising, one or more processors and at least one memory operatively coupled to at least one of the one or more processors and storing instructions that when executed cause the at least one of the one or more processors to: transmit over a first communication network to a user compute device, a processor-executable privacy component configured to (1) be executed on the user compute device, and, (2) when executed on the user compute device: generate at least one pair of asymmetric cryptographic parameters including a private cryptographic parameter and a public cryptographic parameter; and generate a privacy communication request including a digital authentication based on the private cryptographic parameter; receive, over the first communication network, the public cryptographic parameter transmitted by the privacy component executed on the user compute device; receive, over the first communication network, the privacy communication request from the privacy component executed on the compute device, the privacy communication request including: the digital authentication, user input collected by the privacy component, at least one property of the user compute device collected by the privacy component, and at least one first property of a provider server collected by the privacy component; verify the privacy communication request based on the public cryptographic parameter and the digital authentication; generate, if the privacy communication request is verified, a first tagged privacy communication string, a second tagged privacy communication string shorter than the first tagged privacy communication string, and a tagged privacy communication string record in response to the privacy communication request, the privacy communication string record including the at least one first property of the provider server; transmit to the privacy component, over the first communication network, the first tagged privacy communication string and the second tagged privacy communication string, the first tagged privacy communication string and the second tagged privacy communication string configured to be provided to the provider server as part of a secure communication data exchange; receive over a second communication network, a secure communication data exchange approval request from a third server, the secure communication data exchange approval request including an alpha string, a beta string, and at least one provider property; analyze the secure communication data exchange approval request and the tagged privacy communication string record to determine: (a) if the alpha string matches the first tagged privacy communication string, (b) if the beta string matches the second tagged privacy communication string, and (c) a validity metric for the secure communication data exchange approval request, the validity metric determination based on an analysis on the at least one provider property and the at least one first property of the provider server; generate a validation of the secure communication data exchange approval request if: (A) the alpha string matches the first tagged privacy communication string, (B) the beta string matches the second tagged privacy communication string, and (C) the validity metric meets a specified threshold; and transmit to the third server, over the second communication network, the validation of the secure communication data exchange approval request, the validation configured to complete a data exchange between the user compute device and the provider server.

BRIEF DESCRIPTION OF THE DRAWINGS

The skilled artisan will understand that the drawings primarily are for illustrative purposes and are not intended to limit the scope of the disclosure herein. The drawings are not necessarily to scale; in some instances, various aspects of the disclosure herein may be shown exaggerated or enlarged in the drawings to facilitate an understanding of different features. In the drawings, like reference characters generally refer to like features (e.g., functionally similar and/or structurally similar elements).

FIG. 4B and FIG. 4C provide example interfaces, according to some embodiments.

FIG. 9 shows an example GUI screenshot with a transaction form having input field pre-filled by the quick checkout features of a P3 component/application, according to some embodiments.

DESCRIPTION OF EXAMPLE EMBODIMENTS

Figure 1:
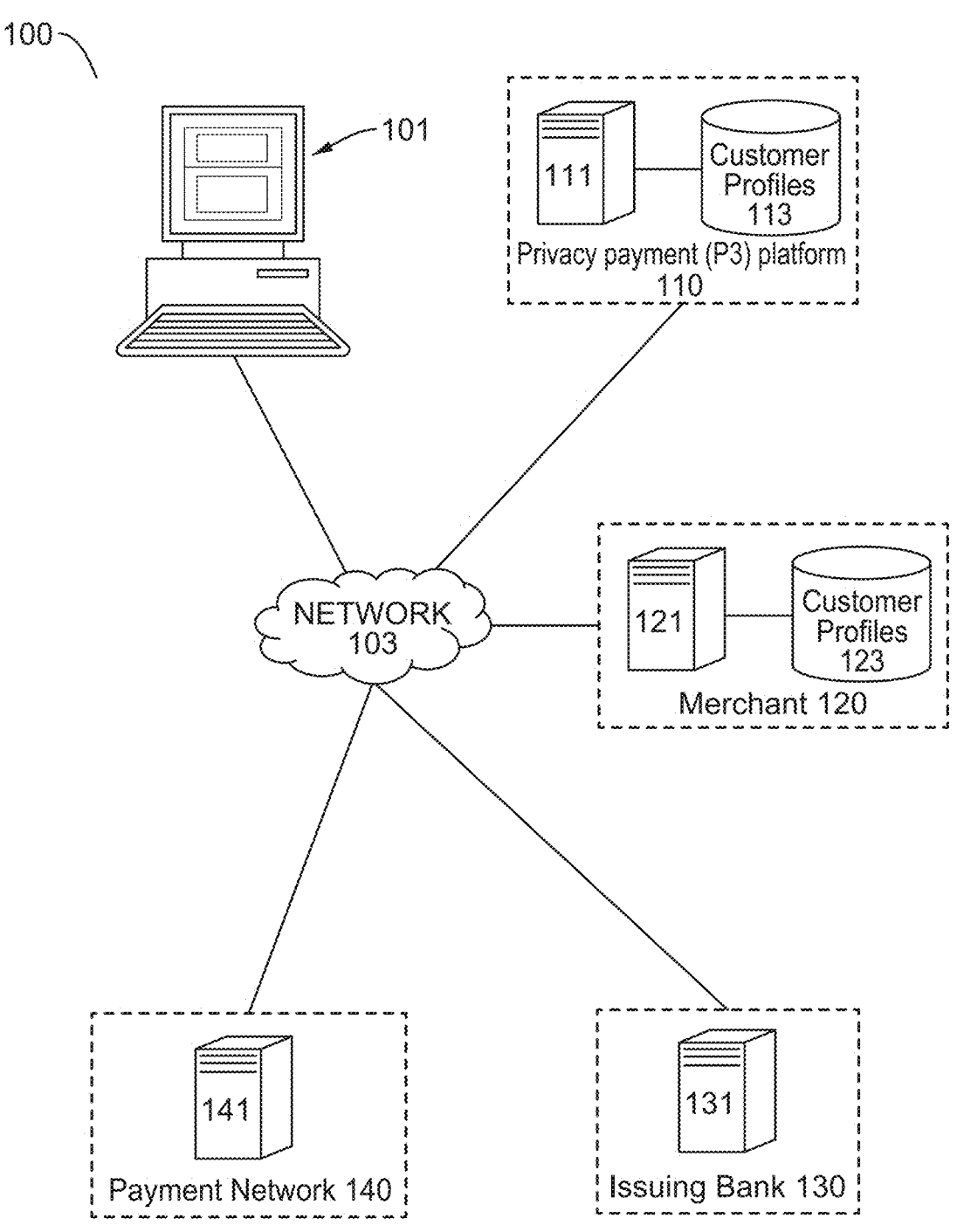
FIG. 1 shows components of a privacy payment platform (P3) online transaction system, according to an example system embodiment.

Consumer demand and regulations are increasing the requirements for improved privacy protections in online communications. It can be beneficial for a third-party privacy service to be involved with communications, to protect consumers' personally identifiable information (PII) from online merchants, service providers, as well as bad actors. Bad actors can include criminals attempting to steal data, financial, exchange, and transaction information, and they can target consumer systems and merchant systems, particularly during communications between consumer devices and merchant servers. Bad actors may also target merchant systems, which can lead to exposure of PII data when bad actors successfully cause a data breach. So-called "grey market" security services may purport to provide protections against the dangers of conducting online communications, but often these grey-market services are nothing more than continuous billing schemes that provide little or no value to consumers.

Accordingly, what is needed is a solution for masking PII from online sites, such as merchants and service providers, during online communications. Such a solution will provide added confidence that data breaches of unsophisticated websites and merchants will not expose a consumer's PII to the world of bad actors and grey-market profiteers. One solution is virtual account numbers and merchant-based issued cards. Virtual account numbers may be limited to a single use, which is the intended benefit for security. Moreover, systems providing virtual account numbers can typically only be used to generate a number with a maximum lifetime spend limit and dated expiration, and can require additional infrastructure adoption by intervening parties. In addition, merchants who wish to issue their own branded cards have to invest in significant infrastructure to accomplish this, and there is no guarantee of widespread adoption.

What is needed is a security tool for protecting online communications that allows users to benefit from the idea of virtual account numbers (i.e., using aliased account or card numbers in lieu of using true account or card numbers), but without the limitations in known virtual account systems. As an example, what is needed are tools and methods for associating identifiers for a payment account or payment card to a specific merchant, as opposed to merchant category codes (MCCs). What is also needed are tools and methods for using cards that are not strictly single use, and that can be reused for payments at a particular merchant, but that cannot be used at a different merchant in the event the card information is stolen from the assigned merchant or intercepted by other methods, such as a man-in-the-middle attack.

In view of the foregoing challenges, various embodiments disclosed herein are generally directed to systems and methods that address known shortcomings, and provide additional and alternative advantages as well. Embodiments disclosed herein can generate and issue privacy communication strings, privacy exchange card numbers/privacy transaction card numbers/privacy payment card numbers that are tagged to a specific server, vendor, provider or merchant, as opposed to being tagged to just a merchant category code (MCC) like in known systems. As such, merchants that store card or account number for later authorization are not storing the consumer's actual account or card number. Moreover, the privacy exchange/transaction/payment cards being issued can be configured to be no different from ordinary cards (at least from the perspective of merchants/providers and payment networks), and are thus not limited in usage, unlike other alternative payment methods. Users can pre-define, via the systems and methods described herein, funding limits, spending limits and the like. The privacy payment cards can be reused, provided the privacy payment cards satisfy the requirements of the privacy payment platform servers described herein.

In sum, one embodiment of the present disclosure is directed to a processor-implemented method for securing and validating multi-server electronic communications over a plurality of networks, that comprises: transmitting from a first server over a first communication network to a compute device (such as a mobile phone, home computer, laptop, etc.), a processor-executable privacy component (such as an extension, app, plug-in, or the like) configured to (1) be executed on the compute device, and, (2) when executed on the compute device: generate at least one pair of asymmetric cryptographic parameters including a first cryptographic parameter and a second cryptographic parameter (e.g., a private key and public key); transmit the second cryptographic parameter to the first server; collect user input to the compute device (including user navigation, login entries, passwords or other validations for the component, etc.); collect at least one property of the compute device (e.g., location, software running, IP address, current time); collect at least one first property of a second server (such as a vendor/merchant/provider server) in communication with the compute device and associated with a data exchange or data transaction (e.g., a secure data transaction for value, services, goods, etc.) between the compute device and the second server; provide an interactive privacy communication tool overlay on a display of the compute device; and generate a privacy communication request based on user interaction with the interactive privacy communication overlay, the generated privacy communication request including: the collected user input, the collected at least one first property of the compute device, the collected at least one first property of the second server, and a digital authentication based on the first cryptographic parameter (e.g., a digital signature); receiving, at the first server over the first communication network, the second cryptographic parameter transmitted by the privacy component executed on the compute device; receiving, at the first server over the first communication network, the privacy communication request from the privacy component executed on the compute device, the privacy communication request including: the user input, the at least one property of the compute device, the at least one first property of the second server, and the digital authentication; verifying the privacy communication request based on the second cryptographic parameter and the digital authentication (e.g., verifying the digital signature with the public key); generating, if the privacy communication request is verified, a first tagged privacy communication string (e.g., a transaction card number), a second tagged privacy communication string (e.g., a transaction card expiry date), and a tagged privacy communication string record in response to the privacy communication request, the privacy communication string record including the at least one first property of the second server; transmitting to the privacy component, over the first communication network, the first tagged privacy communication string and the second tagged privacy communication string, the first tagged privacy communication string and the second tagged privacy communication string configured to be provided to the second server as part of a secure communication transaction; receiving, from a third server over a second communication network, a secure communication transaction approval request, the secure communication transaction approval request including an alpha string (e.g., a proffered card number), a beta string (e.g., a proffered expiry date), and at least one server property (e.g., a proffered provider/vendor/merchant name and/or details); analyzing, via a processor, the secure communication transaction approval request and the tagged privacy communication string record to determine: (a) if the alpha string matches the first tagged privacy communication string, (b) if the beta string matches the second tagged privacy communication string, and (c) a validity metric for the secure communication transaction approval request, the validity metric determination based on: (i) tokenizing the at least one server property, (ii) tokenizing the at least one first property of the second server, and (iii)

conducting clustering analysis on the tokenized at least one server property and the tokenized at least one first property of the second server; generating a validation of the secure communication transaction approval request if: (A) the alpha string matches the first tagged privacy communication string, (B) the beta string matches the second tagged privacy communication string, and (C) the validity metric meets a specified threshold (e.g., if the card number and expiry date matches a corresponding record for a tagged privacy card, and the analysis matches the merchant requesting payment to the merchant tagged to that card); and transmitting, to the third server over the second communication network (e.g., a payment card network, such as Visa®, American Express®, MasterCard®, or STAR® networks, etc.), the validation of the secure communication transaction approval request, the validation configured to complete a data transaction (e.g., allow a transaction between a user and a merchant) between the compute device and the second server.

Another embodiment of the present disclosure is directed to a processor-implemented method that comprises: transmitting, via a communication network, a processor-executable privacy payment component configured to (1) be executed on a user compute device, and, (2) when executed on a user compute device: monitor user navigation on the user compute device; monitor navigated site data; collect navigated site information; collect user compute device information; provide an interactive privacy payment tool overlay on a display of the compute device based on monitoring specified values corresponding to a transaction checkout on a navigated merchant site; and generate a privacy payment card request based on user interaction with the interactive privacy payment tool overlay, the generated privacy payment card request including navigated site information and user compute device information collected by the privacy payment component, the navigated site information having navigated merchant site information. The method also includes receiving, via a communication network, a privacy payment card request from the privacy payment component executed on a user compute device, the request including navigated site information and user compute device information, the navigated site information having navigated merchant site information; generating a tagged privacy payment card and tagged privacy payment card record based on the privacy payment card request, the tagged privacy payment card record including navigated site information, the tagged privacy payment card being tagged to a merchant corresponding to the navigated merchant site information; transmitting, via a communication network, information regarding the generated tagged privacy payment card to the privacy payment component, the information configured to be provided by the merchant site to at least one payment network; receiving, via a communication network, a transaction approval request for the tagged privacy payment card from at least one transaction submitted to at least one payment network; analyzing the transaction approval request and the tagged privacy payment card record to determine a validity metric for the transaction approval request; generating a response to the transaction approval request, the response including (A) a validation of the transaction approval request based on the validity metric meeting a specified threshold, or (B) a declination of the transaction approval request based on the validity metric not meeting the specified threshold; transmitting, via a communication network, the generated response to the transaction approval request; and updating the tagged privacy payment card record. Apparatuses and systems can be configured to perform the method, and the method can be embodied as processor-issuable instructions on a non-transitory medium.

It should be appreciated that all combinations of the foregoing concepts and additional concepts discussed in greater detail below (provided such concepts are not mutually inconsistent) are contemplated as being part of the disclosure herein. All combinations of claimed subject matter appearing at the end of this disclosure are contemplated as being part of the disclosure herein. It should also be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive systems, methods, and apparatus for automatically securing and validating multi-server electronic communications, exchanges, and transaction across networks. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

The present disclosure is here described in detail with reference to embodiments illustrated in the drawings, which form a part here. Other embodiments can be used and/or other changes can be made without departing from the spirit or scope of the present disclosure. The illustrative embodiments described in the detailed description are not meant to be limiting of the subject matter presented here.

FIG. 1 shows components of an online transaction system 100, according to an example system embodiment. The example online transaction system 100 comprises a client/user compute device or computer 101, a privacy payment platform (P3) system 110, a merchant system 120, an issuing bank system 130, and a payment network system 140, which may be interconnected to another through various networks 103, including payment networks, the Internet, and/or the like. In operation, end users may use a client compute device 101 to sign up for a P3 system 110 that provides clients secure payment services when initiating/conducting online transactions. When the client compute device 101 is used to purchase/transact merchandise or services from a merchant system 120 (e.g., online retailer, provider of goods/services, etc.), P3 services 110 can be injected into the payment transaction authorization process, between the merchant system 120 and the payment network 140, to mitigate the likelihood of fraud or credit card theft.

A client compute device 101 operated by an end user may be used to initialize online transactions and provide data to the various systems 110, 120, 130, 140 of the online transaction system 100. The client compute device 101 may be any computing device comprising networking interface circuitry, such as a network interface card (NIC) or similar component, and a processor capable of accessing data over a network 103. Non-limiting examples of the client compute device 101 may include a workstation computer, desktop, laptop, tablet, smartphone, server, or other similar device. In some implementations, the client compute device 101 may execute one or more P3 components, such as software modules for a web browser application, which may generate a graphical user interface (GUI) allowing the user to interact with servers hosting the consumer-facing systems 110, 120.

The client compute device 101 can execute one or more components or software modules of a P3 application associated with the P3 system 110. In some implementations, the P3 application or component may be "plugin" for the web browser application executed locally on the client compute device 101. In some embodiments, the P3 application is received from the P3 system 110 and/or an associated server or entity. It is to be understood that a component, such as a mobile application or a plugin application for a web browser constitutes a distinct product comprising a series of machine-readable software code and computer instructions, stored in memory, that, when executed on a processor, instruct the client compute device 101 and the web browser on various routines to execute. Moreover, each of the different web browser applications allow for third-party-developed software modules, such as plugins, to be accessed by the particular browsers in different ways. For example, for example, Mozilla Firefox® may allow for so-called "add-on" software applications, whereas Google Chrome® may allow for so-called "extensions." It is to be understood that various terms used herein, including, by way of non-limiting example, component, app, plugin, add-on, and extension, could be used to reference an additional software module implemented on and accessed by client compute device and/or associated programs, such as a web browser, to provide external functionality that is normally not native to a client compute device and/or associated programs, such as a web browser. It should be appreciated that the disclosed components, such as browser plugins, provide technical solutions to the technical shortcomings identified in known technology (e.g., web browsers, webservers). In some implementations, a P3 application may be a standalone software application that is executed locally on the client compute device 101, and may communicate with the server computers 111, 121 hosting customer-facing systems. And, in some implementations, the P3 application may be a standalone mobile software application executed on a mobile device, where the client compute device 101 is such a mobile device (e.g., laptop, smartphone, tablet computer).

A P3 system 110 may comprise one or more P3 servers 111 and one or more customer profile databases 113. The P3 system 110 may include a web-based software application, accessible under a Software-as-a-Service (SaaS) model, such that the P3 systems 110 and related software applications are executed by the P3 servers 111 and little to no software processes are required by a client compute device 101. For example, a client compute device 101 may execute a web browser application that executes software routines to access webpages, but execute few software routines for the P3 system 110. In this example, the web browser may comprise a plugin that may execute software routines that communicate data with the P3 servers 111, and the majority of the routines associated with the P3 system 110 are executed by the P3 servers 111. It should be appreciated that the division of functions between the client compute device 101 and P3 servers 111 may vary across embodiments, and may be tailored for the power of the client compute device and/or the available bandwidth (e.g., if only a relatively low-bandwidth communication network is available, the processing can be allocated to reduce the amount of information passed between the client compute device and the P3 servers).

The software routines of the P3 system 110 may register customer data that is stored into a customer profile database 113, monitor online transactions of a client compute device 101, and execute a number of routines to secure an online transaction when a new online transaction initiation is detected by the P3 system 110. P3 servers 111 can include one or more computing devices having processors configured to execute the one or more software components or modules that provide end users the various features of the P3 system 110 described herein. A P3 server 111 may comprise network interface circuitry, such as a network interface card (NIC) or similar component, allowing the P3 server to communicate with various devices in the system 100, over a network 103. The P3 server (or servers) 111 can be configured to continuously communicate and monitor the online activity of the client compute device 101, and can determine or detect that the client compute device 101 is engaged in or engages into an online transaction with a merchant (provider) system 120. In some embodiments, the client compute device 101 may have a P3 component, such as a web browser plugin, installed locally, where the browser plugin (or other component) can detect the instance of online transaction and can then establish one or more privacy processes with the P3 server 111. That is, in such embodiments, when the client compute device 101 navigates to a webpage comprising a web transaction form, the P3 component or browser plugin detects that the browser is at a webpage with a transaction form (e.g., as detailed below) and consequently transmits an indication signal to the P3 server 111 indicating that the client compute device 101 has landed at the online transaction form. In this example, the P3 server 111 would then be triggered to execute privacy processes.

The P3 system 110 may comprise a customer profile database 113, which may be hosted on one or more computing devices comprising non-transitory machine-readable storage media configured to store customer profile data. In operation, the P3 server 111 may be communicatively coupled to a customer profiles database 113 via a network 103; where the network 103 may include a private network that is internal to the P3 system 110. The P3 server 111 may register new users, generate new P3 card accounts, and perform authorization checks for transactions received from a payment network system 140.

During registration, the P3 server 111 can receive data inputs from a user, including funding account identifiers. A funding account may be the source of funds associated with a particular P3 account, such as a user's bank account, payment card account (credit, debit, stored value, etc.), and/or cryptocurrency account. Although embodiments described herein describe funding accounts as being a checking account, debit card, or credit card, it should be appreciated that the disclosed embodiments can be configured to be funding account source payment system-agnostic. Non-limiting examples of a funding account may include a bank account (e.g., checking, savings), a payment card account (e.g., credit, debit, stored value card, gift card), non-payment card credit (e.g., fixed term loan, alternative lending, etc.) and cryptocurrency (e.g., Bitcoin). Nothing described herein should be construed as limiting upon the nature of the payment system employed as the funding account for a P3 card account.

The P3 server 111 can then establish encrypted connections with those funding accounts, which can be at any of a variety of entities, including banks and/or other financial institutions. When instructed to generate a new P3 account, the P3 server 111 can request that an issuing bank system 130 and/or server 131 (or other funding source system or server) link the new P3 account to that funding account. The P3 server 111 can also access this funding account for billing purposes. In some instances, the P3 system 110 may function as an issuing bank system 130, or vise-versa, and thus may be the understood as the same entity/actor and/or be contractually related.

In some embodiments, the P3 component can generate a public-private key (or parameter) pair associated with the user's account. The private key/parameter can be stored with the P3 component (also referred to as a "privacy application") on the user's compute device 101, and the public key/parameter transmitted to the P3 server 111 (and stored in an associated user or customer profile database 113). The private key can then be used to sign data transmitted with requests to generate new P3 card accounts. The public key can be stored into the user's profile and can be used by the P3 server to determine the authenticity of the user's request for a new P3 card account received from a P3 component.

During a process for generating a new P3 card account, after the P3 server 111 is instructed to generate a new P3 card account, the P3 server 111 can determine the authenticity of the request based on any number of factors about the user, user's compute device, and other factors, which can include thousands of data points. The P3 server 111 can store data/one or more records indicating the merchant/provider involved/associated with an ongoing transaction (referred to herein as a "tag" or "merchant tag"), for which the user has requested a new P3 card account. The P3 server 111 can store this tag into a record for the new P3 card into the user's profile, along with the other relevant information associated with the new P3 card (e.g., card number, CVV, payment network system 140).

During a transaction authorization process, the P3 server 111 can receive or intercept an authorization query issued from a card network server 141 to an issuing bank server 131. In some cases, the P3 component/privacy application can alert the P3 server 111 to the transaction and the P3 server 111 can receive the transaction data before an authorization request is sent from the merchant server 121 to a payment network server 141. The P3 server 111 can ultimately determine whether to authorize the transaction, as the P3 server 111 informs the issuing bank server 131 or card network server 141 whether the card is acceptable for the particular transaction. The P3 server 111 can query the customer profiles database 113 to determine whether the data about the card and the user matches what is stored for the card in the customer profiles database 113. In some cases, the P3 server 111 can determine whether the merchant system 120 identified in the transaction data matches to a merchant associated with the particular P3 card being analyzed, as indicated by the merchant tag stored in a record of the P3 card in the customer profiles database 113 (in some embodiments stored in and/or associated with a user/customer profile or record).

A merchant system 120 can include a merchant server 121 configured to host the webpage associated with an ongoing, online transaction. The merchant server 121 can accept payment information for the transaction via a transaction form, from a user's computing device 101. The merchant server 121 can parse the relevant payment information and information about the user from the transaction form, and then forward the transaction data to payment network system 140 for authorization. In some cases, the merchant server 121 can store some or all of the transaction data into a merchant server 121. The data in the merchant server 121 may be vulnerable to being hacked, and thus the stolen, accurate information may be used by bad actors to commit identify theft and fraud with actual information. Depending upon the response from the payment network system 140, the merchant server 121 may go through with the transaction or reject the transaction.

An issuing bank system 130 may comprise banking server 131 that may accept requests for a new P3 account from the P3 servers 111, and then generate the accounts according to the information provided from the P3 server 111. It should be noted that, in some embodiments, the banking system 130 issues what appears to be a full-service credit card or debit card, with no limitations on its use. Functionally, the limitations on uses of the new P3 card (also referred to herein as a privacy transaction card or privacy payment card) are imposed by operation of the P3 system 110. That is, when the issuing bank server 131 receives from a card network server 141 of payment network system 140, a request to authorize a transaction, the issuing bank server 131 queries the P3 server 111; and the P3 system only authorizes those transactions where the merchant tag associated with the P3 card account in the user profile database matches the merchant identified in the current transaction data.

A payment network system 140 may be a payment network, such as Visa®, American Express®, MasterCard®, STAR®, or the like. The payment network system 140 may comprise a card network server 141 configured to receive payment authorization requests from merchant servers 121, during or after online transactions. P3 card accounts, like any other credit or debit cards, are issued through a payment network system 140. When a merchant server 121 queries the card network server 141 on whether a card should be authorized for a transaction, the card network server 141 may review the card digits to identify the issuing bank system 130. The card network server 141 may then query the issuing bank server 131 whether to authorize the card. In some implementations, the issuing bank server 131 may forward the authorization query to the P3 server 111, which then performs the requisite determinations, including whether the transaction data identifies the correct merchant that matches the P3 card's merchant tag. The card network server 141 may then return an approval or rejection to the merchant server 121 based upon how the issuing bank server 131 and P3 server 111 responds.

Figure 2:
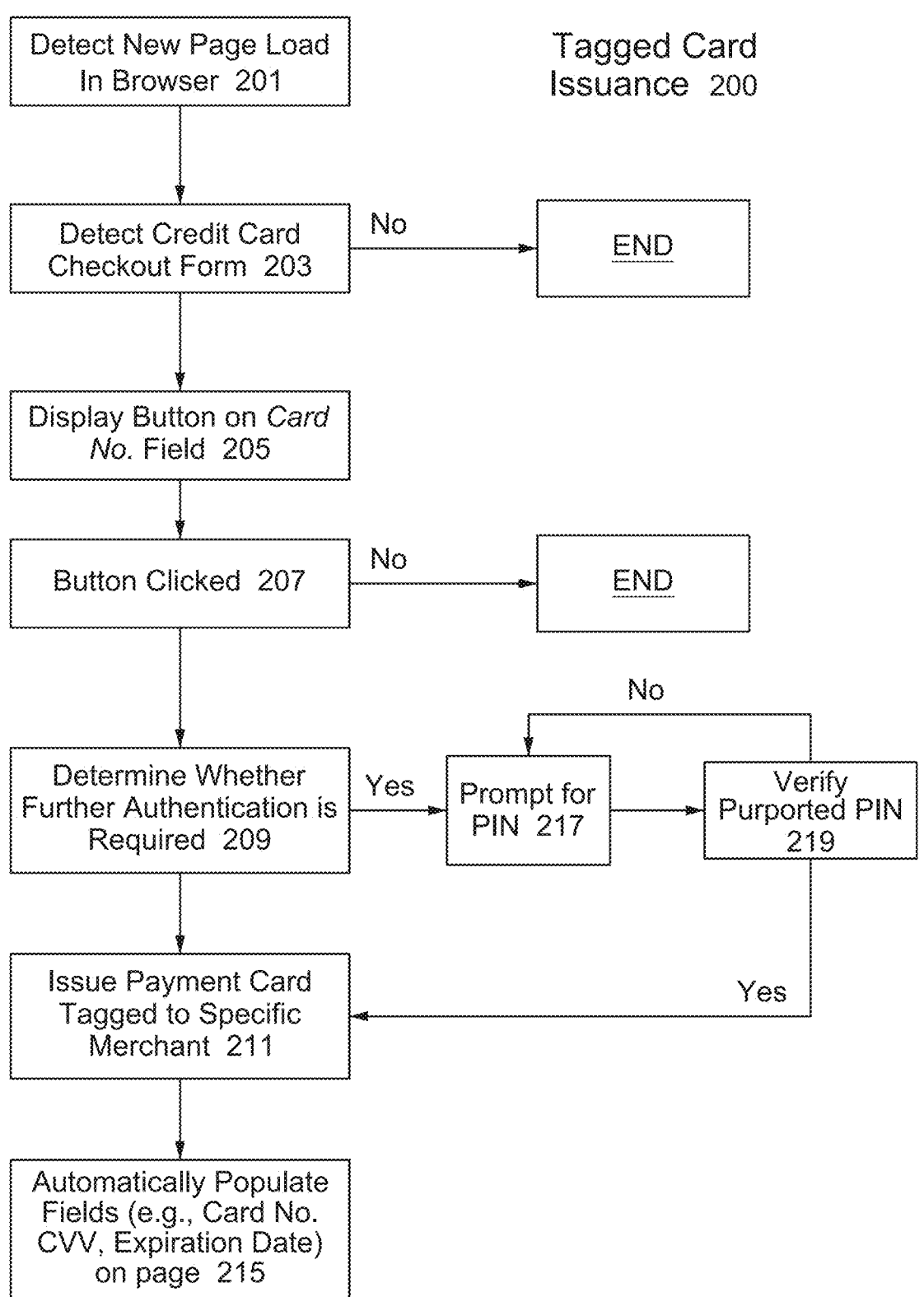
FIG. 2 shows a flowchart for issuing a new tagged P3 card to a registered user of a P3 system when the user is making a purchase online (i.e., "checkout"), according to an example method embodiment.

FIG. 2 shows a flowchart for issuing a new tagged card to a registered user of a P3 system when the user is making a purchase online (i.e., "checkout"), according to an example method 200 embodiment. In the example method 200, a user's compute device (such as a workstation computer) is executing a web browser pointed to a URL for an online transaction's checkout form. In this example, the user's compute device securely communicates with P3 servers, over one or more networks, through one or more P3 components/privacy applications, such as software modules that function as a browser plugin, and thus monitors the traffic and software code associated with the various webpages accessed by the browser.

At 201, the privacy application detects that the browser has accessed and loaded a new webpage. The privacy application can monitor and review aspects of the IP packets that are received by the user's computer, depending upon which layer or layers of the TCP/IP stack or OSI model the privacy application is configured to monitor. In this example, the privacy application can review HTTP code and HTTP requests, such as GET and POST commands, as well as the various types of software code underlying the webpage (e.g., JavaScript, HTML, etc.). That is, the privacy application can run in the context of the webpage on the client-side, and is therefore agnostic/unaware of the server-side applications and modules used by the server (e.g., scripting engine, webserver application, scripting language). In some implementations, the privacy application can review these and/or other aspects of the code received when a webpage is loaded to determine whether the privacy application should execute processes associated with online transaction protection.

At 203, after reviewing the newly-loaded webpage, the privacy application can detect that the webpage comprises a transaction checkout form requiring the user to input a card number (e.g., credit card, debit card, prepaid card) or account number, as well as other information associated with authorizing the online transaction.

At 205, after detecting that the newly loaded webpage is a checkout form, the privacy application can display a button associated with the privacy application ("card generation button") that triggers the card generation processes of the P3 system. In some implementations, the privacy application can manipulate the graphical user interface (GUI) of the webpage, such that the card generation button appears on or near certain data input fields of the checkout form. In some implementations, for example, the card generation button can appear in the browser next to a Card No. input field prompting the user to input his or her card number.

At 207, the user may click the card generation button, which can trigger the P3 system to execute card generation processes, but without sending any instructions via the browser to the webpage to advance the browser. When the card generation button is clicked, the P3 component/privacy application can trigger one or more P3 servers of the P3 system to open a request for a new card from a card issuer. The input triggering the card generation processes is not limited to a button, but that the input can be any components, means, or tools for the privacy application to convey instructions to the software modules executed on the one or more P3 servers to begin executing the card generation processes.

At optional 209, the P3 server or privacy application can determine whether further authentication is required, such as requesting the user enter a PIN number. In some instances, a user may not be logged into their account with the P3 system, and therefore is prompted for additional authentication credentials. These credentials can allow the privacy application to access the user's privacy account, stored on the user profiles database of the P3 system. In the event the user is already authenticated into their privacy account, or the privacy application is not configured to have such an additional layer of security, then the example method 200 can progress to a conditional 211.

In some embodiments, when a new account is generated, the P3 server can generate and store public and private keys for future use in asymmetric cryptography, which are then provided to the privacy application executed locally, on the user's computer. When a user begins generating a new P3 card account, the public key is provided to the P3 server and the private key stays in the browser or in the P3 component/privacy application. So when the user issues the request to create a P3 card account, the P3 server can generate and store data about the user's computer(s), privacy application, and browser, such as the fonts that are installed, history, certificates, the plugins that are installed, or the user's screen resolution. This data can be defined as a P3 fingerprint for the user, user's compute device, browser, etc., and such data can contain a set of or multiple data points, in some instances, upwards of thousands of data points, about the user's compute device, privacy application, browser, and/or the like. The P3 server can then compare that data with what is known about the user when the user originally registered with the P3 system to make sure the same user, compute device, and/or browser is involved in the ongoing method 200. In some cases, for example, the P3 server can geolocate the IP address, to make sure the user is operating from an expected location. When the user issues the request, the privacy application on the user's computer signs the request with the user's private key to prove that the identity of the user has been thoroughly vetted. This now-signed data is transmitted to the P3 server, along with an identification of the merchant's website associated with the request for the new P3 card number. As a result, in some embodiments, only the public key on the P3 server is used to verify the signature, and thus the P3 server can determine when a person without the private key is trying to intercept the request or issue a request. In some implementations, as previously mentioned, a PIN can be employed to be certain of the user's identity, beyond the automatically collected data.

At 211, after the P3 server or the privacy application determines that authentication is not needed or that the user has already been successfully authenticated into their privacy account, the P3 server can issue a new payment card that is tagged to the specific merchant that is party to the ongoing online transaction. At 211, the P3 server can access a card issuer server to request generation of a new account, on behalf of the user. The account of the user can be generated as an actual credit card account or bank account by the bank, card issuer, or other type of financial institution whose servers are configured to receive instructions from the P3 server. The issuer bank, in conjunction with the P3 system, then issues the user the account, which the P3 server then "tags" (i.e., associates) to the current online merchant. That is, after the P3 server stores the new account information into the user's profile record stored in the profile account database, the P3 server also generates data indicating that the particular account is limited to use for the particular merchant. This data (referred to herein as a "tag") is stored into and/or associated with the record of the new account/user's profile record, and can be referenced by the P3 server in the future to determine whether to authorize transactions attempting to submit the new account's number to a merchant as a method of payment. Depending on the implementation, the user record, user profile, account(s), tag(s), card(s), etc. can be stored in a single record or in multiple, linked/associated records on one or more servers and/or databases.

At 215, after generating the new account and storing the data associated with the new account (e.g., card/account number, authorization code (CVV), expiration date, merchant tag) into fields of the user profile database, the P3 server can automatically populate the input fields of the online transaction form on the merchant's payment webpage. That is, the data stored in the fields of the new account can be fetched or otherwise transmitted to the privacy application on the user's computer from the P3 server. The privacy application can then automatically populate the online transaction form by identifying the attribute indicators for the particular transaction form, and then using the matching the data field for the new account received from the P3 server. The form can then be submitted to the merchant's webserver or server belonging to a third-party payment-processing vendor, to complete the online transaction.

At conditional 217, after determining at 209 that user authentication is required for the privacy application and/or P3 server to access the user's profile record, the privacy application can generate a prompt for an authentication input. In the example method 200, the privacy application can generate a GUI input prompting the user to input a PIN number. It should be appreciated that any number of authentication techniques and tools can be applied, such as two-factor and/or biometric authentication, and that the authentication techniques are not limited to only PIN number authentication.

At 219, the P3 server can verify the purported PIN submitted by the user. The PIN number of the user can be stored in any number of locations (e.g., locally on the user's computer, P3 server, user profile database), and can be referenced by the P3 server to compare against the inputted PIN number. At 219, the privacy application can transmit the purported PIN to the P3 server, which can compare the purported PIN against the pre-stored PIN that the user selected at an earlier time. If the user is successfully authenticated, then the example method 200 can proceed to a conditional 211. Otherwise, the method 200 ends, and the user can manually enter card information into the page, as the user's computer and local privacy application are denied access to the user's account at the P3 system.

Figure 3:
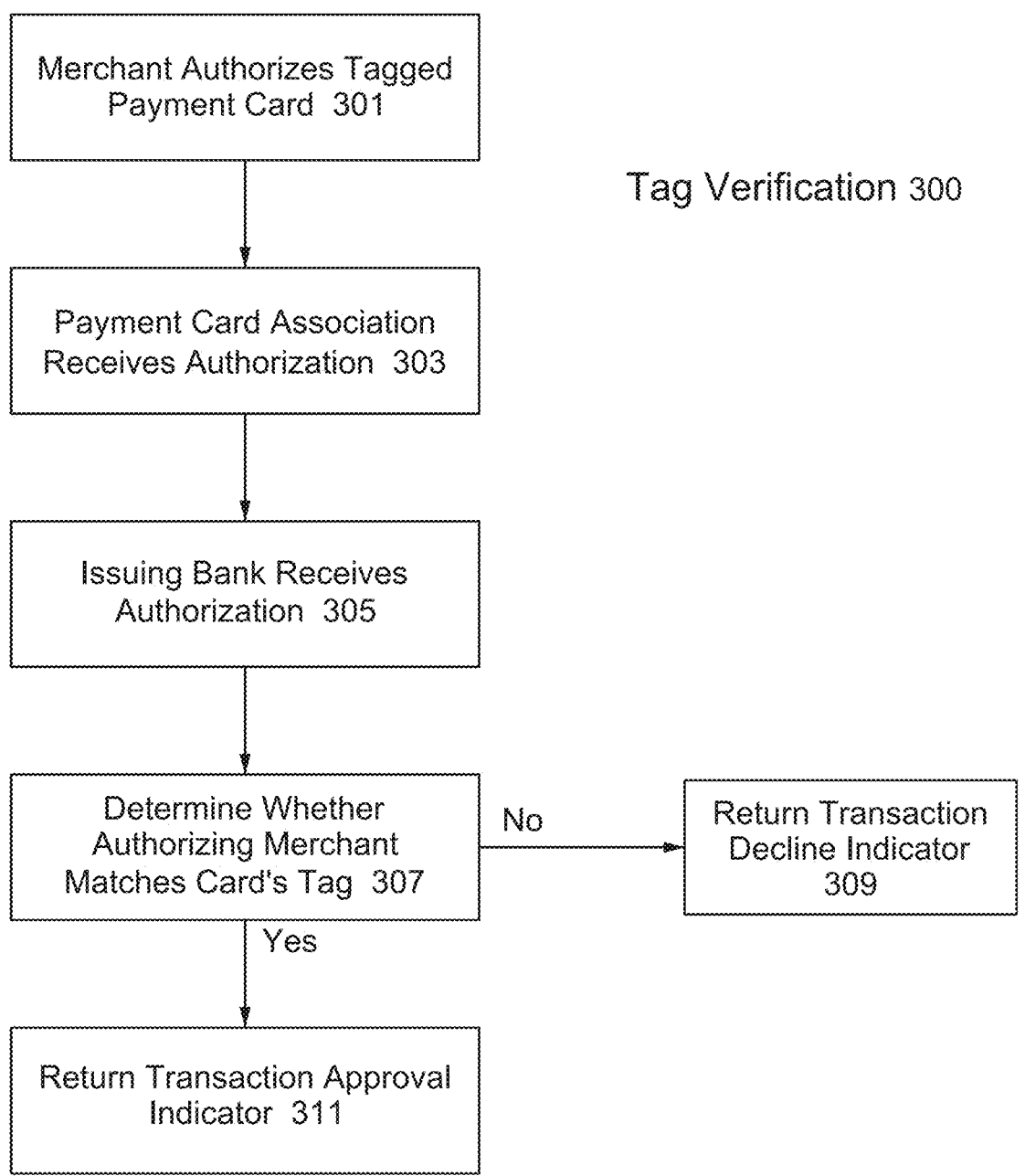
FIG. 3 shows execution of a tag verification process to determine that a payment method is tagged for payments with a particular merchant, according to an example method embodiment.

FIG. 3 shows a flowchart for a tag verification process to determine that a payment method is tagged for payments with a particular merchant, according to an example method 300 embodiment. At 301, a merchant system submits a card/account number for authorization to a payment network system (e.g., Visa®, American Express®, MasterCard®, STAR®) or other financial system controlling the particular account. The merchant system may comprise any number of servers responsible for processing incoming online transaction form data, or the merchant system may transmit the data from the online transaction form to the servers of a third-party payment-processing vendor. In either case, the card number information and any other relevant data can be submitted to the appropriate verifying party, after the online transaction form containing the payment data is received from the user's computer.

At 303, the payment card's verification network system (e.g., Visa®, American Express®, MasterCard®, STAR®, etc.) receives the authorization request from the merchant servers, and then forwards the authorization request and associated transaction payment data to the issuing bank. In some embodiments, the issuing bank is a distinct entity from the P3 system. But, in some embodiments, the P3 system can be implemented as a feature of the issuing bank, or the P3 system can be registered to operate as an issuing bank and/or maintains a contractual relationship with a banking entity, whereby the P3 system can function in some respects as an issuing bank. In some embodiments, several numbers of the card number can be configured to identify the issuing bank as the appropriate party to authorize the transaction. As such, the servers of the network system can use these numbers to route the payment authorization request and transaction data to the issuing bank.

At 305, the issuing bank receives the authorization request from the payment network system. For ease of discussion, in the example method 300 the issuing bank is also the P3 system, though it should be appreciated that these can be separate entities, or the issuing bank and P3 system can be associated according to any number of possible relationships whereby payment and transaction data is shared.

At 307, the servers hosting the P3 system of the issuing bank can determine whether to authorize the payment by comparing fields of the transaction data against fields stored in the user profile database. The P3 server can receive the card number and then cross-reference the card number against the corresponding record in a user profile database. Using the transaction data, the P3 server can determine not only whether the data associated with the card number is generally correct (e.g., card number, CVV, name, address), but can also determine whether the transaction data identifies the merchant as the particular merchant tagged to the particular card number. Known systems may determine whether the inputted data is accurate and satisfies the required data field inputs. Some known systems may link cards/accounts to categories of merchants through the well-known MCC coding standards, which limits the category for the card number. In some cases, known systems may limit the number of uses for the card number. Some known systems are available to merchants wanting to publish their own merchant-specific branded cards, such as gift cards, but these can be unwieldy, and are not brand agnostic. Here, the transaction data contains an indicator for the particular merchant associated with the transaction, which can then be matched to a tag stored in the record of the P3 card. Thus, the limitations are addressed, but there is additional protection over known authorization techniques, because a card number stolen from Merchant A cannot be later used to pay for transactions to Merchant B, as the P3 server will automatically review the transaction data before the issuing bank issues an authorization response to the network system servers.

At conditional 309, after the P3 server determines from the transaction data that the merchant is not the merchant identified by the tag stored in the record for the card number, as indicated in the user profiles database, the P3 server or issuing bank server can then return a rejection or decline indicator message to the servers of the payment network system. It should be noted that the card owner's true and accurate information may be submitted for verification, but the transaction will still be declined. A bad actor, such as a hacker, may be able to steal enough accurate data about the card/bank account and its owner to be capable of submitting the requisite information. The payment, however, can be rejected at 309 when, in 307, the transaction data for the merchant is not matched to the tag associated with the card number under scrutiny.

At 311, after the P3 server determines from the transaction data that the merchant is the merchant identified by the tag stored in the record for the card number, as indicated in the user profiles database, the P3 server or issuing bank server can then return an approval indicator message to the servers of the payment network system.

Figure 4A:
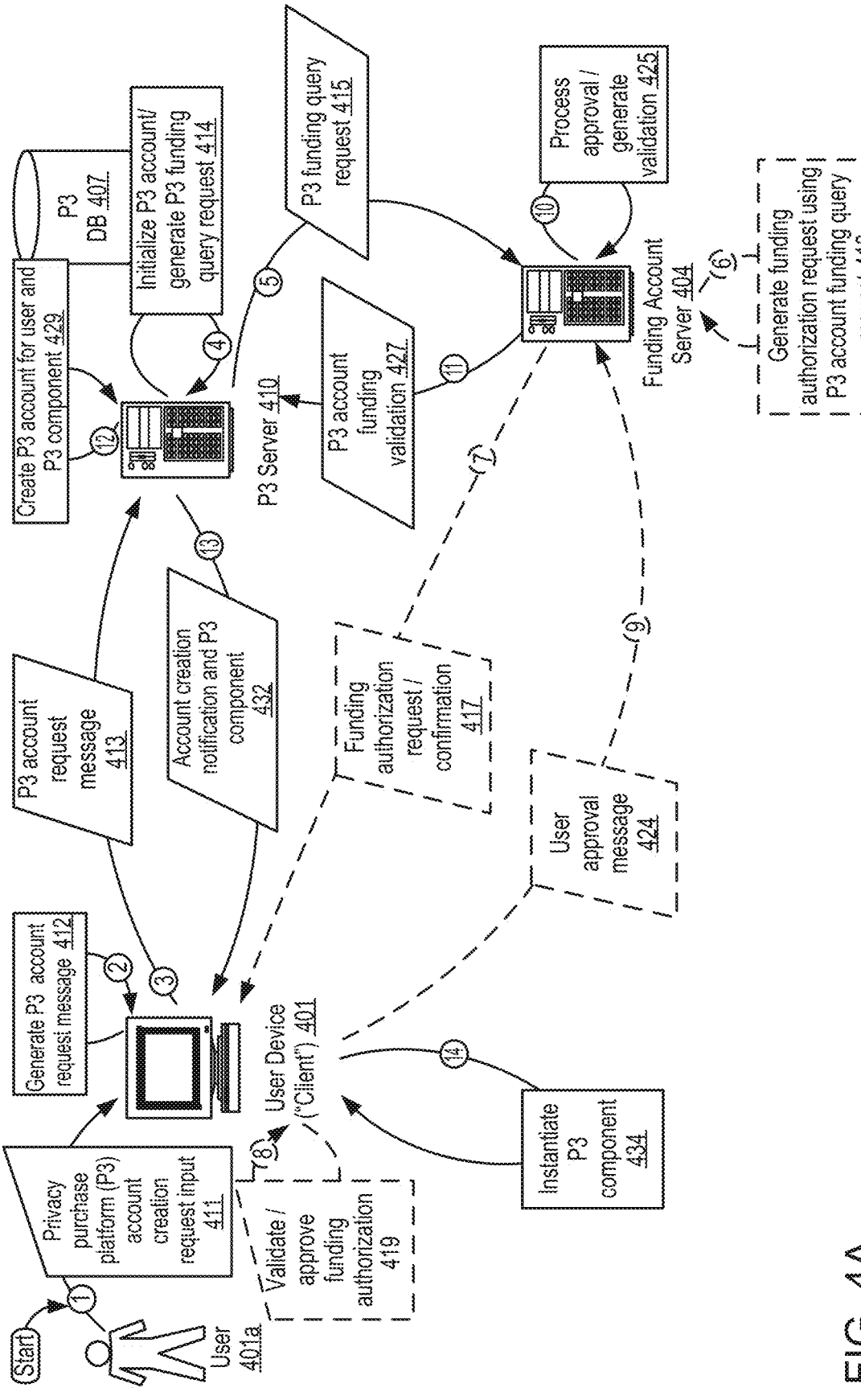
FIG. 4A provides an example data flow diagram for account initiation and validation, according to some embodiments.
Figure 4C:
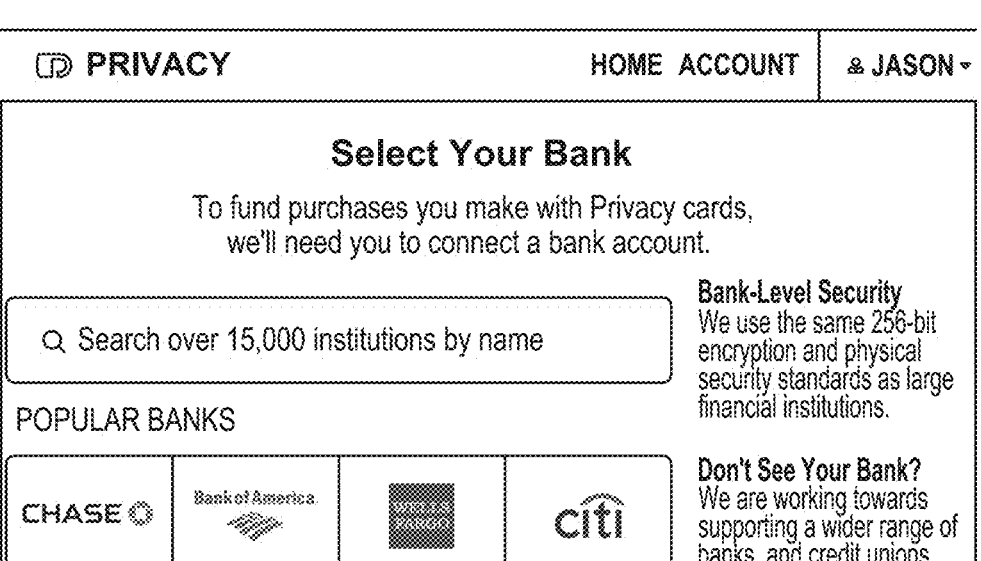
Figure 4C:
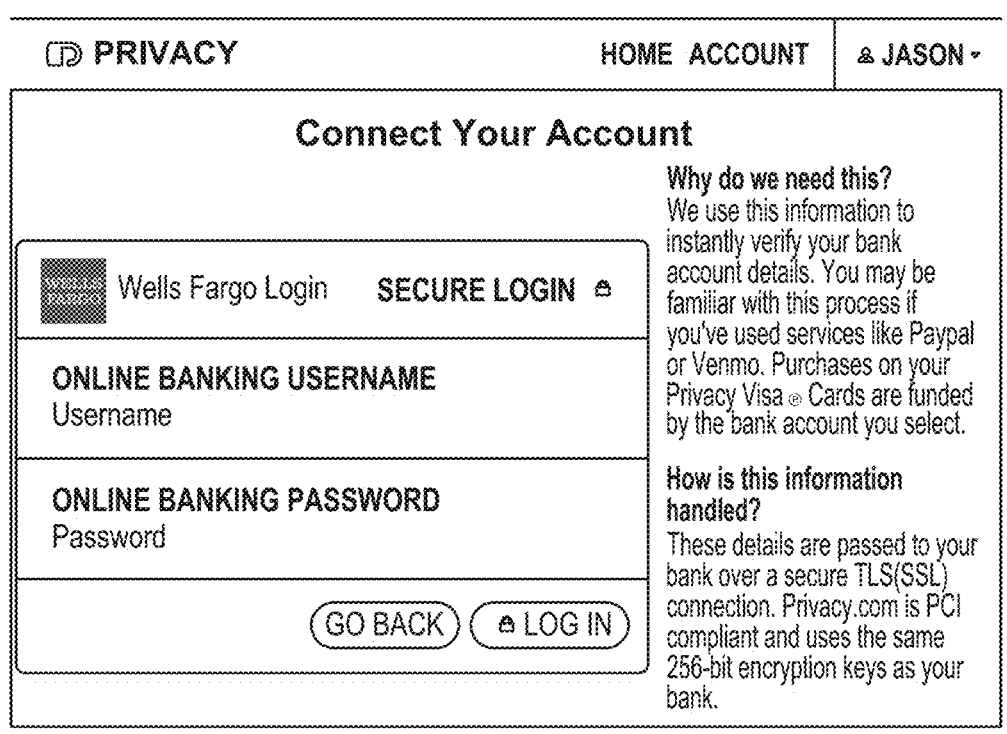

FIG. 4A provides an example data flow diagram for P3 account initiation and validation. A user 401a may navigate to or otherwise provide input 411 for P3 account creation, and the user compute device 401 generates 412 and sends an account creation request message 413 to the P3 server 410. In some instances, account creation is accomplished by a user accessing a web portal hosted on a webserver associated with the P3 system. FIG. 4B shows example P3 account creation interfaces 400a, 400b (i.e., graphical user interfaces or GUIs) that are configured to receive various user account creation data, including email, password, access code (if applicable), name, address, birthday, and/or the like, which can be stored in a P3 database 407. During account creation, a user can indicate/input one or more funding sources (e.g., as illustrated in the example interfaces 400c, 400d shown in FIG. 4C), such as the user's credit card accounts, checking accounts, savings accounts, or other financial accounts the user wishes to use a funding source to generate P3 card(s)/account(s). The user data can be used to initialize/generate a P3 account and/or generate a P3 funding query request 414 (i.e., to make sure a user's P3 account/card can be funded and/or confirm that a user's stated information (identity, location, funding information, and/or the like) is accurate/truthful). Although embodiments described herein describe funding accounts as being a checking account, savings account, debit card account, or credit card account, it should be appreciated that some embodiments can be configured to be funding account source agnostic/payment system agnostic. Non-limiting examples of a funding accounts/sources include a bank account (e.g., checking, savings), a payment card account (e.g., credit, debit, stored value card, gift card), and cryptocurrency (e.g., Bitcoin). The user can also be prompted for general information about the user (including preferences, interests, demographics, etc.) and/or know-your-customer (KYC) and/or other regulatory data. In some embodiments, a funding source may be required for the user to create a P3 account, while in other embodiments, a specified funding source is not initially required for a user to create a P3 account, though in such embodiments, a validated funding source can be required prior to providing a user with a P3 card for use in a transaction.

A funding query request is sent 415 to a funding account server 404 (e.g., a server associated with a funding checking account indicated by the user-provided information). The funding account server 404 can validate 425 the funding query request, and provide an account funding validation 427 to the P3 server 410. The funding account server 404 (or other server) can generate a funding authorization request 416, which is sent/transmitted 417 to the user for validation/approval 419 by the user/user device 401, and the approval 424 returned to the funding account server 404. In some instances, the funding account server or other server can generate a message to the user/user device, such as a text message, mobile application message, email, and/or the like, to which the user/user device can reply and/or or confirm that the requested funding information is approved/acceptable. In other instances, the funding account server can approve or conduct a micro-transaction (e.g., a transaction for a small amount such as $0.13, $1.07, etc.) that shows up on the user's funding account and the user can provide that specified amount and/or a code associated with the micro-transaction in response to show that the user has access to the account, in order to validate the funding account. Once the P3 server has received validation of the funding account 427, it can create/validate a P3 account for the user (including updating/creating a corresponding record in a P3 database 407) and generate/retrieve/configure a P3 component 429 for the user. A notification is transmitted/sent 432 to the user, indicating the P3 account has been created for them and providing and/or facilitating the retrieval of a P3 component for instantiation on the user device 401. For example, a new, validated user can download, access, and/or otherwise receive/retrieve the P3 component(s) and/or related software program(s)/module(s), that, when activated/instantiated/run, can monitor the user's actions/behaviors/interaction, such as browsing, transactions initiated by the user's compute device (and associated programs), and interact with the P3 system.

Figure 5A:
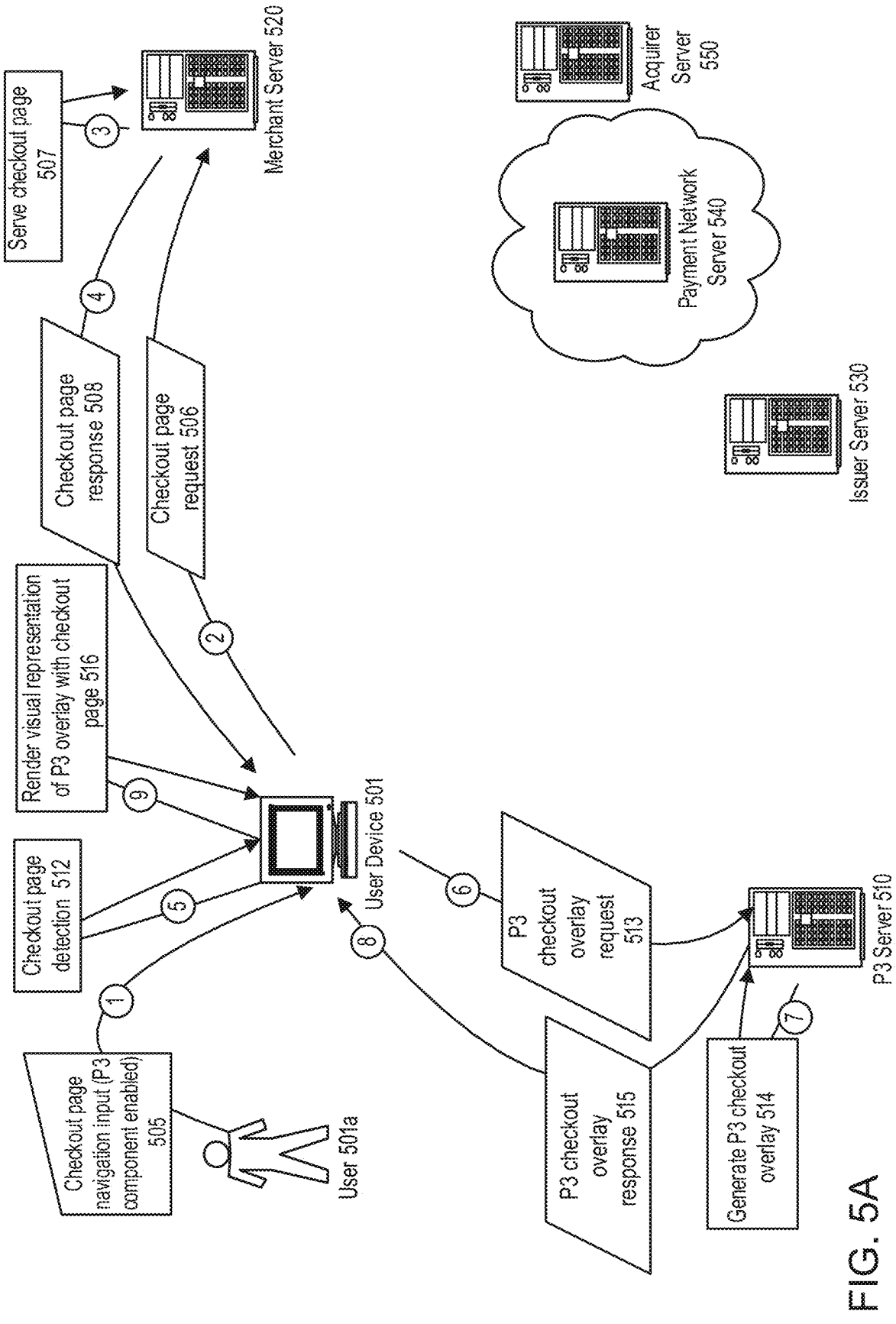
FIG. 5A and FIG. 5B provide example data flows and overviews, according to some embodiments.
Figure 5B:
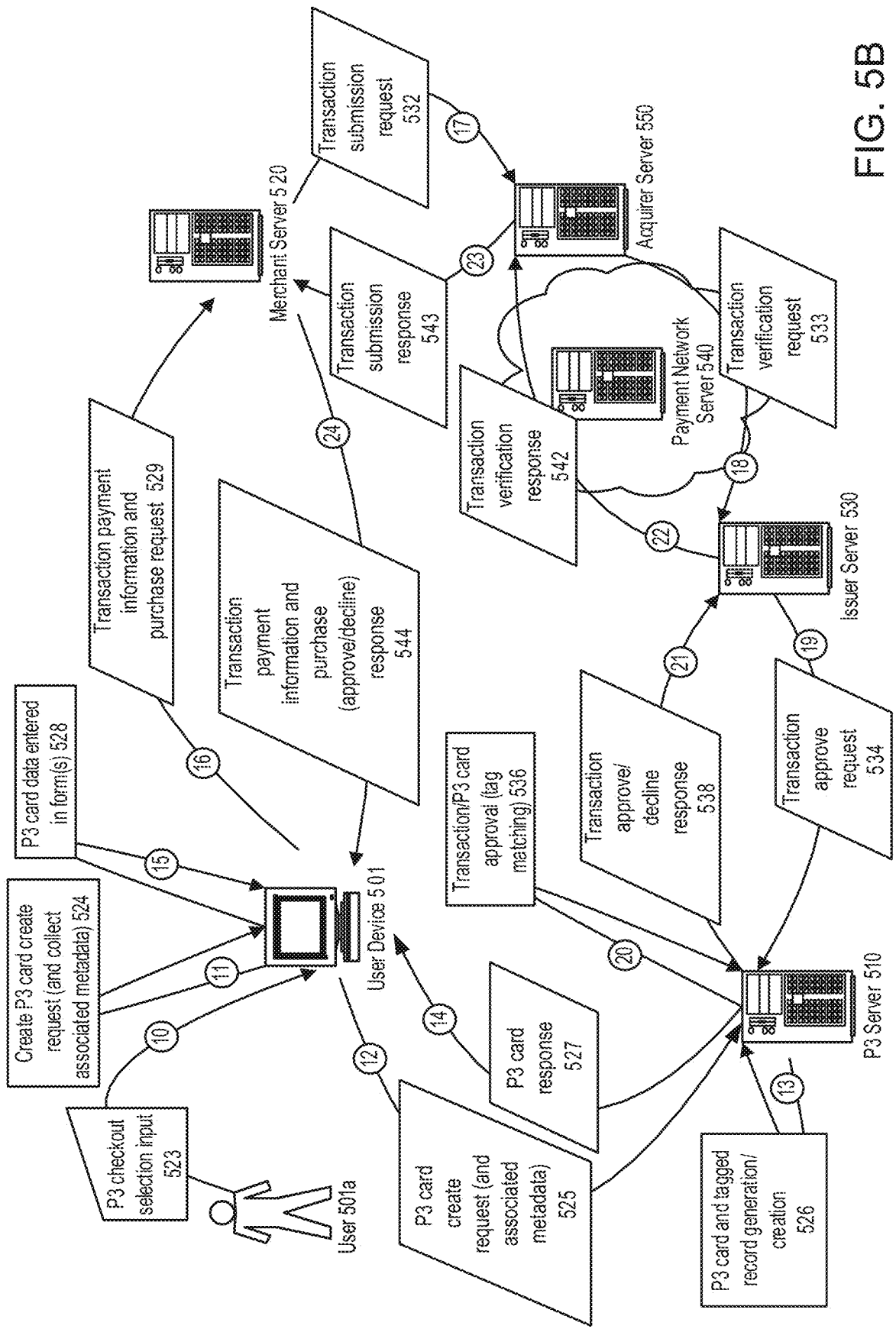

FIG. 5A and FIG. 5B provide example data flows and overviews of some aspects of implementations of embodiments of a P3 system. In the example shown, a user compute device 501 has a P3 component enabled. As discussed above, the P3 component can be an application (e.g., a mobile device application), a browser extension, a plug-in, and/or the like. The user 501a can provide input into the compute device, such as mobile app input (e.g., via a user interface such as a touch screen, voice commands, gestures, eye-tracking, etc.), web navigation input (via keyboard, mouse, other peripheral, etc.), and the P3 component can monitor, track, and/or record such input. Additional input can be monitored, tracked, and/or recorded by the P3 component, including direct input from the user, information/data from another program or application running on the compute device, information/data from compute device sensors/data (i.e., GPS data, BLUETOOTH data, wireless network data, camera data, video data, photo data, microphone data, accelerometer data, etc.), and/or the like. In the illustrated example, a user 501a can provide input 505 to navigate their compute device (with P3 component enabled) 501 to a merchant checkout page. The compute device (and/or associated programs/components) can request the checkout page 506 from the merchant server 520, which can retrieve/serve the checkout page 507 in response 508. The P3 component can determine that a checkout page has been (or will be) provided, using page detection 512. In some embodiments, the P3 component communicates with the P3 server to determine that a checkout page is or will be served, and/or to request an overlay for the checkout page 513 that provides the P3 functionality. In such an embodiment, the P3 server 510 generates a checkout overlay 514 for the checkout page and provides the generated overlay as a response 515 to the P3 component/user device for display with the checkout page. Depending on the embodiment, some or all communications between a P3 component and a P3 server are encrypted (either on-the-fly, via Hypertext Transfer Protocol Secure (HTTPS), and/or via transport layer encryption).

In other embodiments, the P3 component analyzes the user input data and/or the served page data (e.g., from the merchant server 520) to identify a checkout page and provides an interactive P3 checkout overlay for display/presentation to the user (i.e., without additional communication/interaction with the P3 server required). In some embodiments, the P3 component may communicate with the P3 server for the determination if, for example, the P3 component is configured to update, if the site is formatted in such a way that the P3 component cannot readily analyze the collected data, the site is a specified type or identity. In some embodiments of the P3 system, when a web page has finished loading in a browser with a P3 component enabled, the P3 component scans the web page looking for specified inputs within the page, such as, for example: payment card number/primary account number (PAN), e.g., 16 digit card number (or less/more digit number, depending on application/implementation); card verification value (CVV); expiinput and extract features/data of interested by building an object with input attributes such as: element tag name (e.g. select, input); element attribute type (e.g. text, checkbox); element attribute name; element attribute ID; element attribute class; element attribute maxLength; element attribute value; element attribute autocomplete; element attribute size; element attribute tabindex; element attribute placeholder; element attribute pattern; element attribute title; text in the closest html element to the input; and/or the like. For example, in such an embodiment, start with the following HTML snippet:

```
<div class="form_group floating cc_num">
   <label for="cc_num" class="cc_num">Credit Card Number</label>
   <input name="cc_num" type="text" placeholder="Credit Card
Number" class="cc_num" pattern="\d*" autocompletetype="cc-
number">
</div>
```

The P3 component can transpose the highlighted portion of the above HTML snippet into a data object as follows:

```
{
   tag: "input",
   name: "cc_num",
   type: "text",
   placeholder: "Credit Card Number".
   class: "cc_num",
   pattern: "\d",
   label: "Credit Card Number"
}
```

The P3 component can perform a variety of analyses on received data. For example, in one embodiment, the P3 component can conduct lexical analysis on each property via a regular expression (regex) rule. P3 component regex rules can be generated based on analysis of a set of or multiple of e-commerce checkout pages, in some embodiments, hundreds, thousands, or tens of thousands of checkout pages. In some embodiments, the P3 component and/or related components can be used to taxonomize e-commerce checkout pages to find commonalities, and the data used to update/refine and/or generate new regex rules. Example regex rules, determined as described based on P3 analysis of thousands of web pages, are provided below:

| Field | Regex |
|---|---|
| PAN | (card\|cc\|pay).*num\|^cc$ |
| CVV | cvv\|cid\|csc\|spc\|signature.*panel\|secure.*id\|sec(urity)?.*code\|account.*verification\|verification.*(code\|#) |
| Expiration Month | (exp\|card\|cc).*(mo\|mm) |
| Expiration Year | (exp\|card\|cc).*(year\|yr)\|^y{2,4}$ |
| Expiration Date | (card\|cc).*(exp\|date)\|(exp.*date) | ration month, expiration year, expiration date, etc. The P3 component can analyze page data to identify expiration month and year along with expiration date because checkout pages can vary on how the card expiration is inputted, for example, some have separate drop downs for month (Jan(uary)-Dec(ember) or 01-12) and year, while others have a single input of the form MM/YYYY (e.g., 04/2019). In some embodiments, the P3 component analyzes data to identify a checkout form by parsing web page source code, e.g., for <input/> and <select> elements ("inputs"). After parsing out a list of inputs, the P3 component can iterate through each The example data object shown above has seven extracted features/properties, and in an example embodiment, the P3 component can run the five example regex rules listed in the table above against all seven features/properties of the data object. Four of the features (name, placeholder, class, label) match against the PAN regex, and no features match on expiration month, year, or date. The P3 component can add the input to a list of candidates for the PAN field, with a matching score of four, and the repeat the process on all inputs found on the page.

Figure 5C:
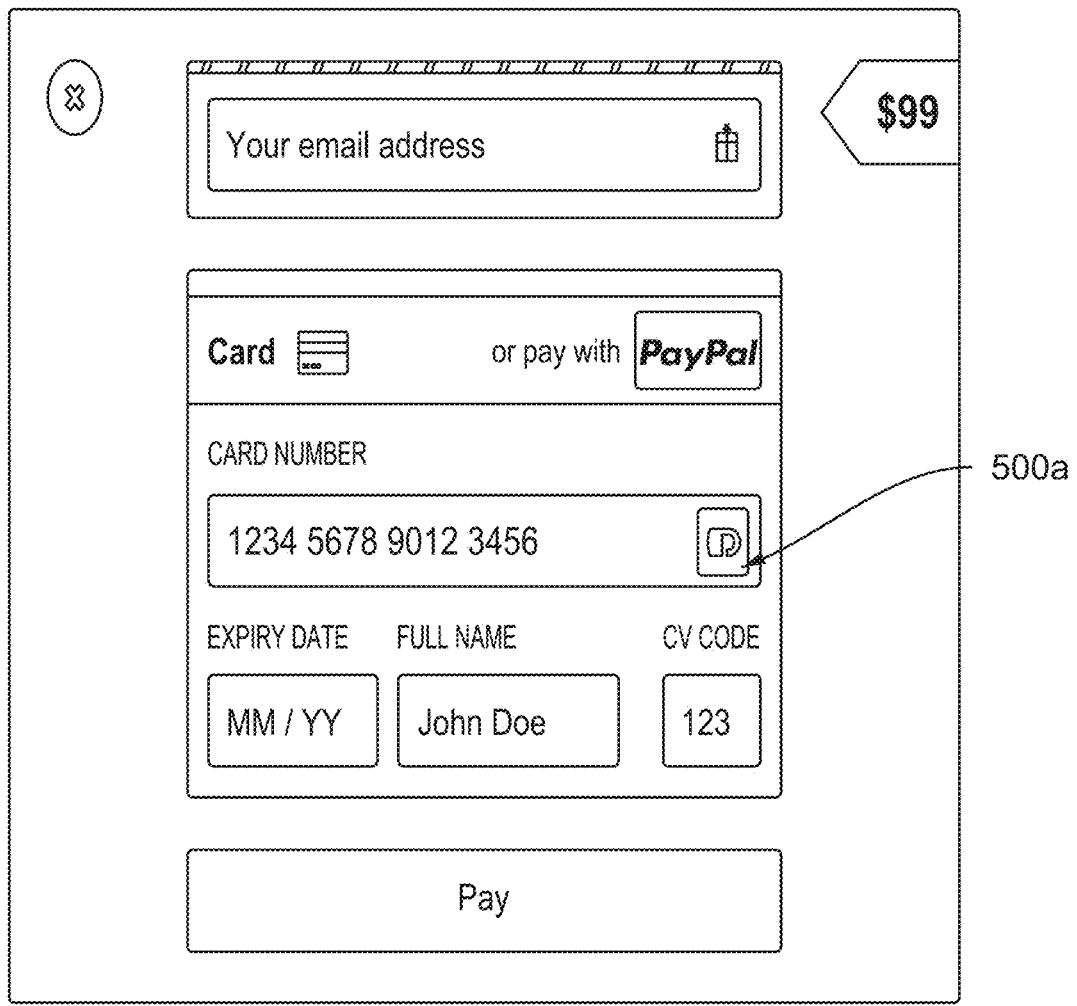
FIG. 5C and FIG. 5D provide example interfaces, according to some embodiments.

Continuing the example, if the P3 component detects one or more PAN candidates along with candidates for either or both expiration month and year or candidates for a consolidated expiration date input, it can be configured to determine that a checkout page has been successfully identified. This is provided as an illustrative example, and it is to be understood that it is not limiting. For example, the CVV can be optional, as some checkout forms may not require a CVV. If no checkout is detected, the P3 component can sleep/cycle, and can re-run the checkout detection logic at a later time if it detects changes to the underlying web page source code. If a checkout is detected, a P3 tool/overlay can be provided, e.g., HTML markup to generate a "P3" button can be injected into the page within the PAN input field (for example, by the P3 component injecting HTML into the page via a browser's extension API). FIG. 5C provides an example interface with P3 component enabled to provide checkout detection 500, and where, based on the P3 component determining the page is a checkout page, a P3 checkout tool/overlay 500a is displayed.

Figure 5D:
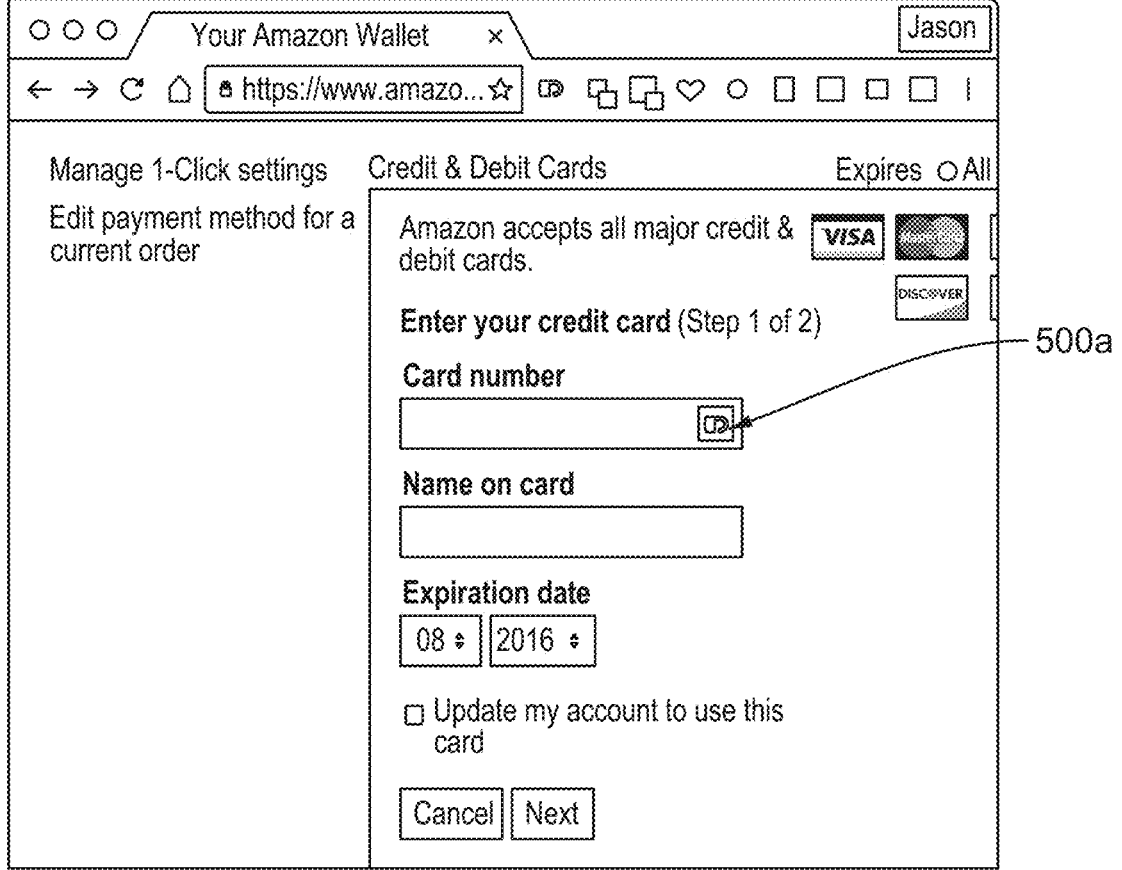

As illustrated in FIG. 5B, when the P3 component receives P3 checkout selection input 523 from the user 501a, the P3 component generates a P3 card create request and collects associated metadata 524, and transmits the P3 card create request 525. For example, if a user is browsing on a merchant page as shown in FIG. 5D, with the P3 component active and P3 overlay tool 500a displayed, a user could click on the P3 overlay tool 500a. The P3 component can issue an P3 card create request to the P3 server, such as in the form provided below:

```
{
    authToken: <my encrypted base64 encoded authtoken>,
    hostname: "amazon.com",
    meta: {
        title: "Your Amazon Wallet"
        tags: [
            {charset: "utf-8"}
        ]
    }
    device: {
        ipAddress: "203.113.160.189",
        resolution: "2560x1600",
        userAgent: "Mozilla/5.0 (Macintosh; Intel Mac OS X 10_11_5)
        AppleWebKit/537.36 (KHTML, like Gecko) Chrome/52.0.2743.116
        Safari/537.36"
    },
    spendLimit: {
        amount: "80.00",
        duration: "MONTHLY"
    },
    total: {
        amount: "79.51",
        currency: "USD"
    },
    avs: {
        name: "Fred Flinstone",
        address1: "301 Cobblestone Way",
        address2: "",
        zipcode: "70777"
    }
}
```

It is to be understood that the example above is non-limiting, and additional data and information not shown above can be included, and certain data shown above not included, without departing from the scope of the disclosure. For example, additional information about the merchant/website/company running it can be provided, depending on the presence of additional <meta> tags. Data collected on card-create request and/or determined from a card-create request can include a user authentication token (e.g., stored inside the component, browser plugin, etc.), compute device IP address/information, device resolution, browser "user-agent" identifier, shopping cart total, billing address entered by customer, website hostname, website physical location, website contact information (email address, phone number, etc.), meta tags in page HTML markup, web browser details/data including cookies and flash objects, device geolocation, device sensor information (GPS, camera, fingerprint scanner, accelerometer, time), behavior information (e.g., device history, browser history, time of day, etc.), and/or the like. Also, as noted in the example above, the P3 card amount can be specified, including the total amount ever, duration (single use, multiple use, single user per time period (e.g., daily, weekly, monthly, quarterly, yearly) can be specified, and in some embodiments, can be specified/configured on card create (i.e., via the data structure shown above). Transaction amount, address, name, and/or the like can additional be utilized or not utilized, depending on the implementation.

The P3 server 510 can then generate/create a P3 card and corresponding record 526 based on the P3 card create request and associated metadata. In some embodiments, the generation of a tagged card is based, at least in part, on the P3 card create request and associated metadata. For example, when generating a payment card number, a portion of the card digits can be specified (e.g., the first six digits can correspond to the P3 system, such as an issuer identifier for the P3 system), and the remaining digits or portion thereof can be randomized, and/or selected based on information included in the received request, and/or data associated with the P3 card that is provided to the P3 component, such as the expiration, CVV, name, address, etc., can be based at least in part on the received request, such as a billing address and/or expiration that is based on a code corresponding to the merchant. The P3 card number (and any additional generated/determined associated data, such as an expiration, CVV, name, etc.) is stored in one or more databases of the P3 server 510 along with the information included in the request to define a tagged P3 card.

Figure 5E:
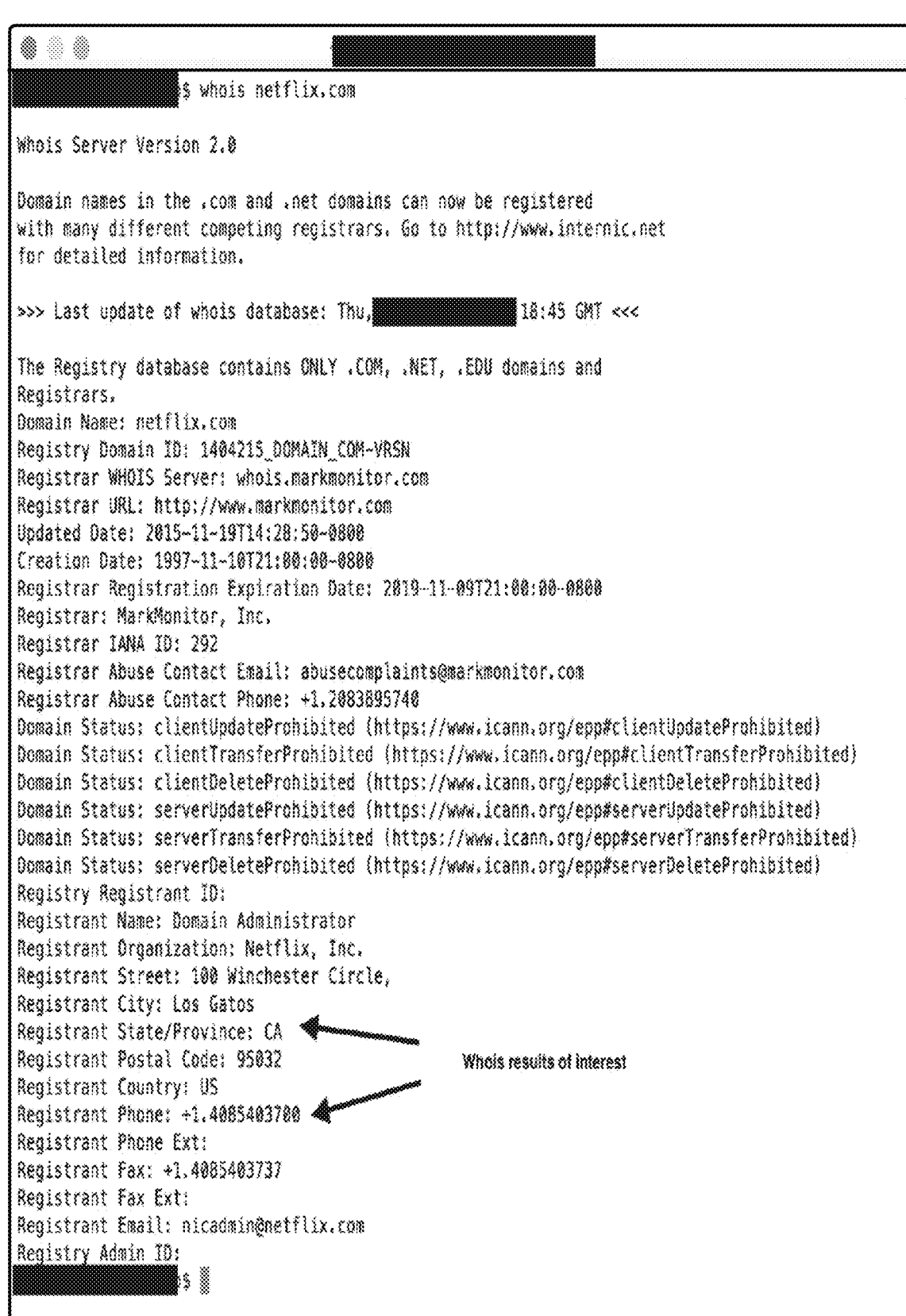
FIG. 5E provides an example query issued by a P3 server, according to some embodiments.

In some embodiments, the collected information/data/metadata included in a card-create request can be further processed/analyzed by the P3 component and/or P3 server to determine if the site/merchant is valid and/or to generate more data for the tagged P3 card record. For example, a query such as illustrated in FIG. 5E can be performed by the P3 server to ascertain a merchant phone number and/or geographic location. Such information (e.g., a merchant's physical location and/or phone number) can be added to a card request object and/or data record as meta tags. Continuing with the previous example, the meta tags now look like:

```
meta: {
    title: "Your Amazon Wallet"
    tags: [
        {charset: "utf-8"},
        {phone: "2062664064"},
        {city: "Reno"},
        {state: "NV"},
        {country: "USA"}
    ]
}
```

The P3 server returns a secure P3 card response 527, such as shown below:

```
{
    PAN: "4111111111111111"
    cvv: "123",
    expMonth: "10",
    exp Year: "2019"
}
```

As discussed above, in some embodiments, the data in the P3 card response can include additional information, such as billing address, billing name, etc., and the information in the response can be generated based on the information/data in the request (e.g., so that a portion of the provided address information and expiration information is coded to merchant information). In some embodiments, the P3 card data can include codes or tags therein that can be used by the P3 server to authenticate a transaction based on the P3 card data and that also conform to a specified format, such as ISO 8583 protocol, so that a merchant server and any other entity that receives a processes the P3 card data does not need to alter their processes and procedures to convey the information along (i.e., the P3 card data appears the same and is processed the same as a regular payment card from the perspective of the merchant and intervening entities, apart from the P3 system). In other embodiments, the P3 card data that is provided to be used in a transaction with the merchant does not include tags or codes, and the relevant data is stored and subsequently validated based on the tagged P3 card record and subsequently received transaction information.

In some embodiments, the entire request object with additional meta tags is stored in a relational database and associated with the generated tagged P3 card. In some embodiments, to support future authorizations, a machine learning algorithm (such as a bag-of-words (BOW) machine learning algorithm) is trained/re-trained with the request object provided and used for matching against future authorizations, as discussed below in greater detail.

In some embodiments, when a P3 card create request is initiated from a P3 component, the P3 server receives and/or determines IP address information for the requesting compute device. This information can be analyzed (e.g., run through a database of IP addresses) to determine approximate geographic location(s) of the compute device. If the geographic location is more than a specified distance (e.g., 500 miles) away from one or more previous geolocation(s) of IP addresses that the particular user has logged in from previously, the P3 server can responds to the P3 card create request with a login prompt to re-authenticate the user before a P3 card request is granted. In some embodiments, the geolocation analysis can be a temporal geolocation analysis where the re-authorization is prompted based on, for example, last login time and last login location (so that user that is only 50 miles away from their previous location is still prompted to re-authenticate if the last login time was 5 minutes previously). The IP address and corresponding geolocation can then be added to the history for the account such that, in some embodiments, future card requests from IP addresses with geolocations nearby a previous geolocation do not cause a prompt for further authentication. In some embodiments, a specified home area or multiple authorized areas are specified in which further authentication is not required but for which transaction outside thereof, further authentication is always required. Additional or alternative analyses can also be conducted, as discussed in reference to FIG. 6.

Figure 5F:
FIG. 5F provides an example interface, according to some embodiments.

Upon receiving the P3 card response, the P3 component displays and/or automatically populates the received information/data (e.g., PAN, CVV, expiration) into the detected fields 528. FIG. 5F provides an example interface displaying a P3 card interface generated and customized based on merchant information included in a P3 card create request. The user compute device 501 can then transmit the transaction payment information (including the P3 card information) and purchase request 529 to the merchant server 520. The merchant server 520 then transmits the payment information (e.g., as a transaction submission request 532) to an acquirer server 550 (for the appropriate acquiring bank), which can in turn transmit a transaction verification request 533 (typically via a payment network and/or payment network server 540) to an issuer server 530 (i.e., of the corresponding issuing bank), which in turn provides a transaction approve request 534 to the P3 server 510. It should be understood that, in some implementations, the acquirer/acquirer server, issuer/issuer server, and/or the payment network may not be included and/or may represent/be associated with the same entity (e.g., if the payment acquirer is also the issuer), and in any event the relevant information starting with the information 532 provided by the merchant server 520 is ultimately provided to the P3 server 510 (e.g., in the form a transaction approve request 534). Following the example above, the information that is provided by the merchant server and goes through to the P3 server includes card information, payment/charge amount, billing information, and card acceptor name and location. The card acceptor name and location can be defined, for example, to be 43 characters in length, divided into 4 distinct sub-properties: positions 1-25 is address data, positions 26-38 is city data, positions 39-40 is state data, positions 41-43 is country data. The disclosed messages conform to the appropriate ISO protocols, and, unlike other payment methods that require use of new data formats, communications equipment, complex security token, and/or complex user-defined rules (e.g., as disclosed in U.S. Pat. App. Pub. No. 2014/0074637, U.S. Pat. Nos. 8,639,623, and 8,229,854, the entirety of each being expressly incorporated by reference herein), do not require any additional burden, bandwidth, or processing power on the part of the merchant server, the acquirer server, the issuer server, and/or the payment network (depending on which are implicated in the transaction). The information/data received by the P3 server is analyzed 536, such as by tag matching and/or as detailed below.

As noted above, the P3 system, unlike other payment systems, does not require additional bandwidth, or even additional processing on the part of the merchant or intermediary parties—the P3 card is handled by them in the same way as a traditional credit card without requiring the merchant to provide additional information, making the P3 system function for old sites and merchants relying on payment methods used more than a decade ago while also being functional with merchants and sites that have the latest payment methods (e.g., tokenized payment, mobile wallet, QR payment, etc.). As such, when the P3 server receives card acceptor name and location, the format and content of that information can vary widely, as illustrated by the example card acceptor name and location information for a single merchant shown below:

| NETFLIX.COM | LOS GATOS | CAUSA |
| FLIX COM LOS GATOS | LOS GATOS | CAUSA |
| NETFLIX.COM | NOTFLIX.COM | CAUSA |

-continued

| | | |
|---|---|---|
| ADY*Netflix | 8765797172 | CAUSA |
| NETFLIX.COM | 8765797172 | CAUSA |
| Netflix | Amsterdam | NLD |
| NTFLIX.COM | 8666797172 | NLD |
| NETFLIX.COM | 8667460414 | ONCAN |
| PAYPAL *NETFLIX.COM | San Jose | CAUSA |
| NETFLIX.COM | 0870 724 0697 | LUX |
| NETFLIX.COM | 018001125102 | CAUSA |
| PAYPAL *NETFLIX.COM | 4039357733 | CAUSA |
| PAYPL *NETFLIX.COM | 4027357633 | CAUSA |
| NETFLIX.COM | SAO PAULO | BRA |
| NETFLIX.COM | 1800 94 86 15 | NLD |
| 1800 94 86 15 | 1800 94 86 15 | NLD |
| NETFLIX.COM | 14097249160 | NLD |
| Netflix.com | Amsterdam | NLD |
| NETFLIX.COM | 8767160414 | CAUSA |
| Flix.com | Netflix.com | CAUSA |
| FLIXP | Losgato | CAUSA |
| NETFLIX COM | LOS GATOS | CAUSA |
| NETFLIX | 12400200202 | CAUSA |
| NETFLIX.COM | 14087249150 | CAUSA |
| NETFLIX.COM | LOS GATOS | CA NZL |
| NETFLIX | COURBEVOIE | FRA |
| NETFLIX.COM | 4087249170 | NLD |

As is apparent, the data that is received by the P3 server can be unstructured, making it difficult to match the transaction message with the merchant that originated the transaction. The address field can generally be used for the name of the merchant/service (though the name is sometime incomplete or missing), and the city field is sometimes used for city, other times with the domain name, phone number, service name, etc., and state and country can sometimes be offshore for a domestic business.

In some embodiments, when the P3 server receives a transaction approve request 534, a confidence score is calculated for whether the charge matches the metadata associated with the data captured when generating the corresponding P3 card.

In some implementations, first the card acceptor name and location→address and city subfields are lexically parsed and tokenized by splitting on any non-alphanumeric characters. This yields what can be understood or defined as a bag-of-words (BOW), and the BOW of the lexically parsed and tokenized subfields defined as a first BOW ("BOW A"). The BOW is data where text (such as shown above) is represented as the multiset of its components, in some embodiments disregarding grammar and word order while keeping multiplicity. A second BOW ("BOW B") can comprise the stored metadata from the checkout page/website collected when the P3 card was generated/created. Depending on the implementation, a variety of processes can be applied, for example, words two characters or less can be stripped from both bags. Similarly, commonly occurring strings (e.g., "www", "inc", and "llc") can additionally or alternatively be stripped out from both bags.

Then, BOW A and BOW B are input to a function (e.g., Bayesian probability function, k-means clustering algorithm, etc.) that returns a percentage confidence score that BOW A is related to BOW B. If the probability is over a specified threshold T, then the P3 server can communicate that the charge is accepted, else the P3 server can communicate that the charge is declined. In some embodiments, threshold T can change as more transactions are processed and/or as a probability function (e.g., Bayes function) and/or cluster analysis (e.g., k-means clustering algorithm) is trained and/or updated with historical data. In some embodiments, if the threshold T was not reached, the P3 server can determine if the P3 card was created within a given time period (e.g., within the past five minutes) and if so, provided the other parameters are within tolerances (e.g., payment amount), the charge can be approved based on temporal locality as an indicator of validity (presuming the probability function returned a false negative). In some embodiments, P3 server authorization decisioning can be enhanced by comparing entered information, such as billing information, at checkout with corresponding information, such as AVS (address verification system) information passed within the authorization message. As discussed above, some information entered at time of billing can, in some embodiments, include coded or tagged information based on the P3 card generation. In some embodiments, the P3 server determines if the authorization amount matches what was collected as the shopping cart total on card create (in some embodiments, within specified tolerances to account for service fees and/or service/convenience charges).

In some embodiments, the P3 server utilizes stream training and matching for authorization. In some implementations, the P3 server utilizes clustering analysis, for example, to analyze two or more BOWs. In one embodiment, BOWs are input to a k-means clustering algorithm. In some implementations, a k-means cluster is retrained every time a new P3 card is generated/created. In some embodiments, a k-means cluster utilizes the number of clusters to compute when the model is trained, and each website for which a card is created on can be a cluster. For each cluster, the P3 server tokenizes every word (and/or every word meeting specifications, such as a length greater than 1 character, etc.) and vectorizes it to create a BOW. Continuing with the above for AMAZON, an example P3 card request would generate a BOW having the form of: ["amazon", "com", "your", "wallet", "utf8", "2062664064", "reno", "nv", "usa"].

Depending on the implementation, the k-means cluster can include more than 100, 500, 1000, 2000, 3000, 4000, 5000, 6000, 7000, 8000, 9000, 10000, 11000, 12000, 13000, 14000, 15000, 20000, 25000, 30000, 40000, 50000, or more than 100000 unique clusters. The table below provides a few illustrative examples:

| Cluster | Associated BOW |
|---|---|
| amazon.com | ["amazon", "com", "your", "wallet", "utf8", "2062664064", "reno", "nv", "usa"] |
| bestbuy.com | ["best", "buy", "expert", "service", "unbeatable", "price", "computers", "laptops", "video", "games", "televisions", "digital", "cameras", "mp3", "players", "mobile", "phones", "cell", "phones", "appliances", "shop", "electronics", "6122911000", "richfield", "mn", "usa"] |

-continued

| Cluster | Associated BOW |
|---------|----------------|
| watsi.org | ["watsi", "global", "funding", "platform", "for", "medical", "treatments", "connect", "donors", "with", "people", "need", "care", "and", "enable", "them", "fund", "low", "cost", "high", "impact", "around", "the", "world", "2567928747", "san", "francisco", "ca", "usa"] |

The P3 server can, in some embodiments, retrain the k-means clustering on each card-create request, to retrain the k-means cluster with the new, additional cluster added, as illustrated by the example code fragment below:

```
# This will create a vectorized representation of the meta tags removing
common words like "the", "to", etc.
    vec = TfidfVectorizer(max_features=10000, stop_words='english')
# all_meta_tags is a list num_clusters long. Each entry in the list is a
BOW for a specific cluster.
    X = vec.fit_transform(all_meta_tags)
# Create the k-means cluster
    km_cluster = MiniBatchKMeans(n_clusters=num_clusters, init='k-
    means++')
    km_cluster.fit(X)
```

The below code fragment shows P3 server determination of whether incoming authorization matches site/data P3 card was generated/created based on:

```
# Authorization_descriptor is a BOW pulled from the "Card Acceptor
Name and Location" property of the authorization message
    auth_vector = vec.transform(authorization_descriptor)
# Similarly, card_create_meta is a BOW collected from the metadata on
the website when the card was originally created
    card_vector = vec.transform(card_create_meta)
    auth_cluster = km_cluster.predict(auth_vector)
    card_cluster = km_cluster.predict(card_vector)
    if auth_cluster == card_cluster:
        return "authorization success"
    else
        return "authorization failure"
```

The transaction approve/success or decline/failure response 538, 542, 543 is transmitted from the P3 server to the issuer server 530, payment network 540, and/or acquirer server 550, and ultimately to the merchant server 520, that can transmit an approve or decline message 544 regarding the user purchase request. The below code fragments illustrate example lexical parsing and matching at authorization, as discussed above:

```
bool TransactionProcessor::_matchesPrevMerchant(const int64_t
cardID, const string& newAcceptorID, const string& newMerchant){
    syslog("Comparing current acceptor against previous transactions for
    card " << cardID << " ");
    result<Transaction> result = db.read("SELECT acceptorID, "
        "descriptor "
        "FROM transactions "
        "WHERE cardID=" + db.escape(cardID) + " "
        "AND accepted=TRUE;");
    if(result.empty( )) {
        syslog( "Card " << cardID << " has no previous transactions to
        match against. Passing this check" );
        return true;
    }
    else{
        bool foundMatchingMerchant = false;
        set<string> newMerchantKeywords =
        _merchantToKeywords(newMerchant);
        for(auto transaction : result){
```

-continued

```
        const string& prevAcceptorID = transaction.acceptorID;
        const string& prevMerchant = transaction.descriptor;
        set<string> prevMerchantKeywords =
        _merchantToKeywords(prevMerchant);
        // Find any mayching keywords between prev and current
        merchant descriptor
        set<string> sharedKeywords;
        set_intersection(prevMerchantKeywords.begin( ),
            prevMerchantKeywords.end( ),
            newMerchantKeywords.begin( ),
            newMerchantKeywords.end( ),
            inserter( sharedKeywords, sharedKeywords.begin( )));
        // matching against previous transaction
        if(newAcceptorID == prevAcceptorID ||
            newMerchant == prevMerchant ||
            !sharedKeywords.empty( )){
            syslog("Card " << cardID << " with transaction " <<
        newMerchant << " (" << newAcceptorID << ") matches
        previous transaction " << prevMerchant << " (" <<
        prevAcceptorID << ")");
            return true;
        }
    }
}
// Womp. no match
    return false;
}
set<string> TransactionProcessor::_merchantToKeywords(const string&
merchant){
    // Split merchant on all non alpha-numeric/digit characters
    // Make a copy of it (as it gets modified "in place" inside
    .GlobalReplace( ). First step is replacing
    // with "|", then splitting into a vector with | as the separator, then
    converting to a set.
    string merchantWithDelimiter = merchant;
    int numReplacements = pcrecpp::RE("[^0-9A-Za-
    z]+").GlobalReplace("|", &merchantWithDelimiter);
    // Compile a list of candidates that will get filtered and put into this
    resulting set.
    vector<string> _kwCandidates =
    Vector::fromDelimitedList(merchantWithDelimiter, "|");
    set<string> keywords;
    for(auto kw : _kwCandidates){
        const string& kwCandidate = kw.toLowerCase( );
        if(kwCandidate.size( ) > 2 &&
        !pcrecpp::RE("www\\.?|\\.?com|\\.?net|\\.?org|inc\\.?|llc\\.?").
        FullMatch(kwCandidate))
            // Only add to the keyword list if its not a commonly occurring
            string
            keywords.insert(kwCandidate);
    }
    // Return it
    return keywords;
}
```

Figure 6:
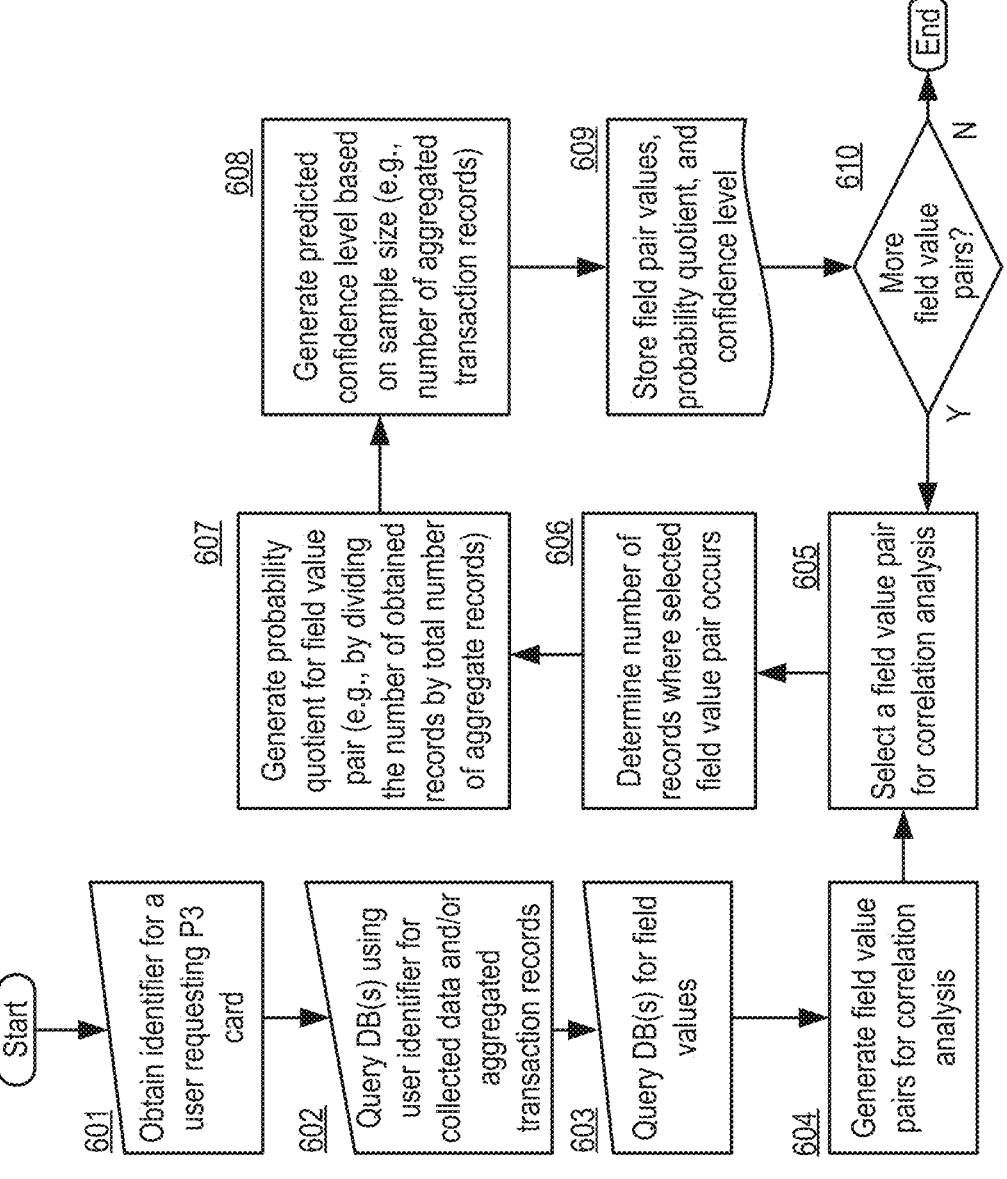
FIG. 6 provides a logic flow diagram illustrating example pattern analytics, according to some embodiments.

FIG. 6 provides a logic flow diagram illustrating example aspects behavioral pattern analysis that can be used upon receiving a P3 card create request when a P3 card create request is initiated from a P3 component, for some embodiments. The analysis can be based on data collected by the P3 component and/or aggregated user transaction data. In some implementations, the P3 component and/or P3 server can obtain an identifier (ID, account identifier, etc.) for a user requesting a P3 card 601. The P3 server can query a database, such as a P3 database and/or payment network database, for user-specific data collected by the P3 component and/or aggregated card transaction data records of the user 602. The P3 server can also query the databases 603 for all possible field values that can be taken by each of the field values (e.g., time, AM/PM, ZIP, merchant name, merchant identifier, transaction amount, cost, etc.). Using the field values of all the fields, the P3 server can generate field value pairs 604 for use in a correlation analysis on the field value pairs. An example field value pair is: "time" is "AM (Pacific)" and "merchant" is "bestbuy.com." The P3 server can then generate/determine probability estimates for each field value pair occurring, for example, occurring in the aggregated transaction data records. For example, the P3 server can select a field value pair 605, and determine the number of records within the aggregated transaction data records where the field value pair occurs 606. The P3 server can then calculate a probability quotient for the field value pair, for example, by dividing the number determined for the occurrences of the field value pair by the total number of aggregate transaction data records 607. The P3 server can also assign a confidence level for the probability quotient based on the sample size 608 (e.g., total number of records in the aggregated transaction data records). The P3 server can generate and store a record 609, such as described above, including the field value pair, the probability quotient, and the confidence level associated with the probability quotient. The P3 server can perform such a computation for each field value pair generated 610. The field value pairs and associated records can be used by the P3 server when determining if a user request is valid, and/or when determining whether to require additional validating information from the user (such as described above when the user is outside of specified geographic area), and the user can be prompted to re-authenticate. Additionally or alternatively, behavioral pattern analysis can be used in validating an incoming transaction, in addition to the transaction/P3 card approval (tag matching), as discussed above. In some embodiments, the P3 system can also utilized machine learning to provide a dynamic (i.e., real-time and/or near real-time) fraud and risk management tools, including P3 fraud/risk scoring. The P3 system collects many different data points per user and transaction which can be aggregated in a centralized database. This data can be secured and augmented with third party data. Machine learning rules can be applied to analyze the data and assign a P3 risk score (e.g., from 1-100, based on increasing risk). This P3 risk score can allow the P3 system to further analyze/determine whether a transaction should be authorized or rejected. This score also allows the P3 system determine what risk management actions it can take with a user, including but not limited to lending and underwriting as well as fraud monitoring and prevention. In some instances, the P3 risk score is dynamic because the machine learning rules run continuously and are constantly refining their algorithms based on the latest data inputs.

Figure 7:
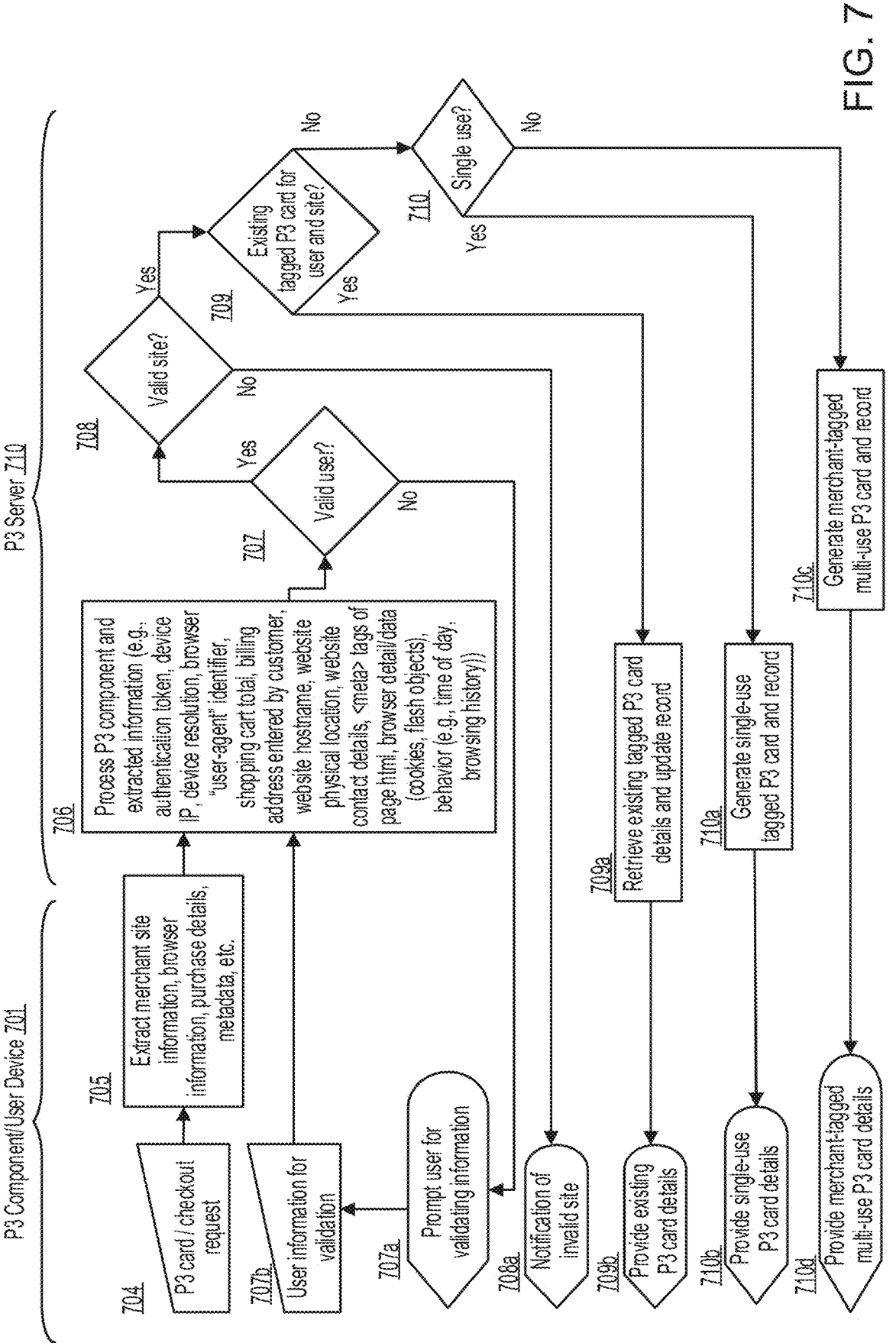
FIG. 7 provides a logic flow diagram illustrating details of P3 card request and authorization, according to some embodiments.

FIG. 7 is a logic flow diagram that illustrates additional details of the P3 card request and authorization and related to the above discussion of FIG. 5B. The P3 component (implemented on/working with a user device) 701 can receive a P3 card request/checkout request 704 (e.g., via a P3 card request tool, 500*a*), and the P3 component extracts merchant site information, browser information, purchase details, metadata, etc. 705. The P3 server 710 receives data/information from the P3 component (e.g., over a network such as the Internet) and processes the P3 component data and extracted information 706. The P3 server can determine if the user requesting the P3 card is a valid user 707 (e.g., via a token in the user's browser, via login/pw credentials, additional data analytics (such as discussed above, including geographic analysis, temporal/geographic analysis, and/or behavioral analysis), and/or the like) and prompt the user 707*a* for validating information 707*b* if there is an indication that the user may not be the valid user or the user session has timed out. The P3 server can also analyze the site/purchase location for or from which the P3 card is being requested to determine if the site is valid 708. Such analysis can be based on site information collected by the P3 component, site keys or certificates, history of the site, owner of the site, location of the site, location of the owner of the site, whether the site is on a fraud list (or the probability the site is related to a site on a fraud list), etc. If the P3 system determines that the site exceeds a specified risk threshold (e.g., either because of collected information or lack of available information, or there is a high likelihood the site is spoofing a legitimate site), or otherwise determines the site is not valid, the P3 server can transmit a notification 708*a* to the P3 component and/or the user that the site is not valid (or has the potential to be invalid). In some embodiments, a determination about the validity of a site can prevent the user from receiving a P3 card for the site, while in other embodiments, the P3 systems can allow the user, once notified about the risk, to proceed with the transaction and accept the risk.

The P3 server can determine if the user already has an existing P3 card that is tagged to the merchant site 709 (typically a multi-use P3 card, as single use P3 cards are limited to a single transaction), and if so, retrieves the information for the existing tagged P3 card 709*a*, provides the P3 card information to the P3 component 709*b*, and updates the corresponding record 709*a*. If the P3 server determines that the merchant site is not already associated with an existing P3 card for the user, the P3 server can determine 710 (in some embodiments, based on user-specified information and/or parameters) if a new card for the site is to be a single use card or a multi-use card (e.g., for reoccurring payments, such as a monthly subscription). If single use, the P3 server generates a merchant-tagged single use P3 card and corresponding record 710*a* (as detailed above) and provides/transmits the single-use P3 card information 710*b* to the P3 component (and in turn the information is provided to the user and merchant corresponding to the tag). If multi-use, the P3 server generates a merchant-tagged multi-use P3 card and corresponding record 710*c* and transmits information regarding that tagged multiuse card to the P3 component for use in recurring payments. In some embodiments, the multiuse tagged card can be configured for recurring payments to the tagged merchant (e.g., a monthly NETFLIX subscription), where the amount is unlikely to vary widely, if at all, and the timing of payment/charge is likely to be at a particular time each time period (e.g., the first of every month, or the first week of every month). In other embodiments, the merchant-tagged, multi-use P3 card can be configured such that a user can use the card at the tagged merchant for a specified or unlimited amount of transactions, and can further be configured to limit the transaction amount per period and/or per transaction. In such embodiments, the P3 component and/or P3 server can still perform the analytics on the user behavior, site information, and/or other collected data to confirm that each P3 card request/transaction request and each payment validation is valid, and the matching (e.g., 536 above) can be performed for each.

Figure 8:
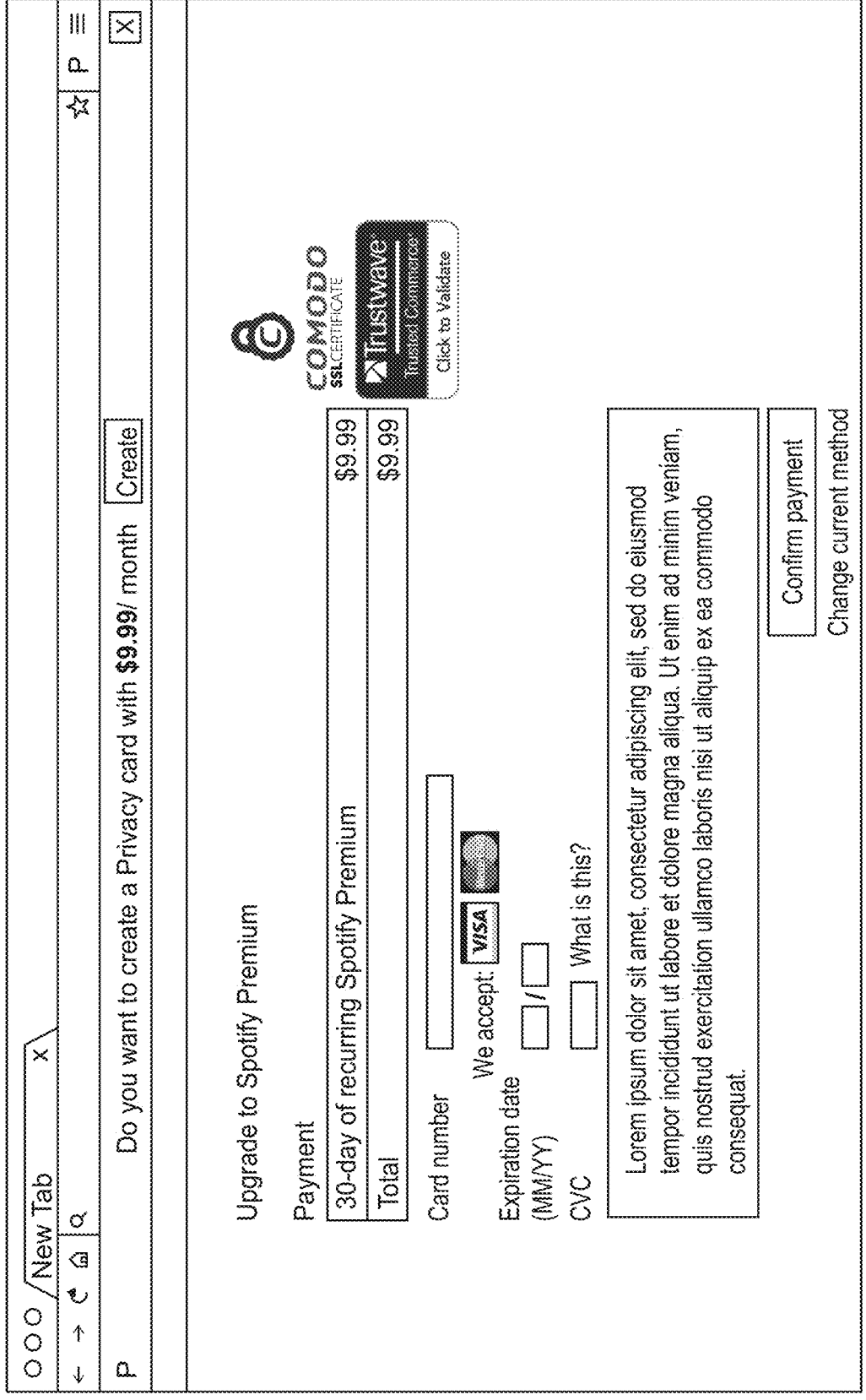
FIG. 8 shows an example GUI screenshots for prompting a user to generate a new P3 card account, according to some embodiments.

FIG. 8 shows an example GUI 800 screenshot showing that the P3 application on the user's compute device detects a webpage containing a transaction form, and then prompts the user either to generate a new P3 card account or to complete the transaction form using an existing, stored P3 card account tagged to that specific merchant/merchant site.

FIG. 9 shows an example GUIs 900 screenshots, showing that the P3 application on the user's compute device can provide a quick checkout feature after detecting that the webpage currently loaded by the browser contains an online transaction form. In a first GUI, the P3 application can detect that the browser has loaded a transaction form and can present a quick checkout button (e.g., 500*a*) that the user can select to quickly populate the fields of the transaction form. Upon clicking this button, the P3 application can fetch the appropriate P3 card information for the user's stored P3 card tagged for the particular merchant associated with the current transaction field. The resulting GUI 900 shows how fields of the transaction form can then be pre-populated by the P3 application by fetching the data stored in the user profiles database of the P3 system.

In some embodiments, the privacy application executed on the user's compute device can encrypt a PIN or other authenticating data input before sending the PIN to the P3 server and/or merchant server through known scripting techniques. Conventionally, JavaScript-based communications are vulnerable to bad actors being able to intercept the PIN number. But the privacy application is able to encrypt the PIN before the PIN is transmitted to the server-side scripting engine, and thus strengthens confidence on the side of the P3 system that the PIN, where known systems could not ordinarily communicate PIN numbers. The ability to use PIN numbers for online transactions is a great benefit, as there are lower incidents of fraud with two-points of authentication. In other words, because the privacy application can function as a browser plugin, the privacy application executes in a privileged execution area, before data is transmitted and vulnerable to interception or corruption. And so as a browser extension, the privacy application can receive the PIN and then encrypt it before it gets to the P3 server, over the Internet. Known payment systems are unable to benefit from PIN transactions because there are no other means for automatically and efficiently encrypting the PIN prior to the JavaScript being provided to the server.

Additional exemplary embodiments are described below:

A1. A processor-implemented method, comprising: transmitting, via a communication network, a processor-executable privacy payment component configured to (1) be executed on a user compute device, and, (2) when executed on a user compute device: collect user navigation on the user compute device; monitor navigated site data; collect navigated site information; collect user compute device information; provide an interactive privacy payment tool overlay on a display of the compute device based on monitoring specified values corresponding to a transaction checkout on a navigated merchant site; and generate a privacy payment card request based on user interaction with the interactive privacy payment tool overlay, the generated privacy payment card request including navigated site information and user compute device information collected by the privacy payment component, the navigated site information having navigated merchant site information; receiving, via a communication network, a privacy payment card request from the privacy payment component executed on a user compute device, the request including navigated site information and user compute device information, the navigated site information having navigated merchant site information; generating a tagged privacy payment card and tagged privacy payment card record based on the privacy payment card request, the tagged privacy payment card record including navigated site information, the tagged privacy payment card being tagged to a merchant corresponding to the navigated merchant site information; transmitting, via a communication network, information regarding the generated tagged privacy payment card to the privacy payment component, the information configured to be provided by the merchant site to at least one payment network; receiving, via a communication network, a transaction approval request for the tagged privacy payment card from at least one transaction submitted to at least one payment network; analyzing, via a processor, the transaction approval request and the tagged privacy payment card record to determine a validity metric for the transaction approval request; generating a response to the transaction approval request, the response including (A) a validation of the transaction approval request based on the validity metric meeting a specified threshold, or (B) a declination of the transaction approval request based on the validity metric not meeting the specified threshold; transmitting, via a communication network, the generated response to the transaction approval request; and updating the tagged privacy payment card record.

A2. The processor-implemented method of embodiment A1, wherein the transaction approval request includes a transaction value, and validation of the transaction approval request includes issuing a transfer instruction for a transfer from a user funding account for an amount corresponding to the transaction value.

A3. The processor-implemented method of embodiment A1 or A2, wherein analyzing the transaction approval request and the tagged privacy payment card record includes tokenizing and vectorizing words in the transaction approval request and tokenizing and vectorizing words in the tagged privacy payment card record.

A4. The processor-implemented method of any of the embodiments A1 or A2, wherein analyzing the transaction approval request and the tagged privacy payment card record includes (a) tokenizing and vectorizing words in the transaction approval request, (b) tokenizing and vectorizing words in the tagged privacy payment card record, and (c) conducting clustering analysis on the tokenized and vectorized words in the transaction approval request and the tokenized and vectorized words in the tagged privacy payment card record to determine the validity metric.

A5. The processor-implemented method of any of embodiments A1 to A4, wherein the tagged privacy payment card is configured for a single transaction with the merchant.

A6. The processor-implemented method of any of embodiments A1 to A4, wherein the tagged privacy payment card is configured for multiple transactions with the merchant.

A7. The processor-implemented method of any of embodiments A1 to A4, wherein the tagged privacy payment card is configured for periodically reoccurring transactions with the merchant.

A8. The processor-implemented method of any of embodiments A1 to A7, wherein the user compute device is a mobile device and the privacy payment component is a mobile device application.

A9. The processor-implemented method of any of embodiments A1 to A7, wherein the privacy payment component is a browser plugin.

A10. The processor-implemented method of any of embodiments A1 to A7, wherein the privacy payment component is a browser extension.

A11. The processor-implemented method of any of embodiments A1 to A10, wherein the validity metric is determined based on k-means clustering analysis of the transaction approval request and the tagged privacy payment card record.

A12. A non-transitory computer readable medium comprising instructions for securing and validating multi-server electronic communications, the instructions when executed causing at least one processing device to perform the method of any of embodiments A1 to A11.

A13. A system for securing and validating multi-server electronic communications over a plurality of networks, the system comprising: one or more processors; and at least one memory operatively coupled to at least one of the one or more processors and storing instructions that when executed cause the at least one of the one or more processors to perform the method of any of embodiments A1 to A11.

A14. A system for securing and validating multi-server electronic communications over a plurality of networks, comprising, the system comprising: one or more processors and at least one memory operatively coupled to at least one of the one or more processors and storing instructions that when executed cause the at least one of the one or more processors to: transmit over a first communication network to a user compute device, a processor-executable privacy component configured to (1) be executed on the user compute device, and, (2) when executed on the user compute device: generate at least one pair of asymmetric cryptographic parameters including a private cryptographic parameter and a public cryptographic parameter; and generate a privacy communication request including a digital authentication based on the private cryptographic parameter; receive, over the first communication network, the public cryptographic parameter transmitted by the privacy component executed on the user compute device; receive, over the first communication network, the privacy communication request from the privacy component executed on the compute device, the privacy communication request including: the digital authentication, user input collected by the privacy component, at least one property of the user compute device collected by the privacy component (e.g., geo-location, configuration, resolution, IP address, etc.), and at least one first property of a provider server collected by the privacy component (e.g., a provider/merchant/retailer/vendor name, contact data, location, identifier, etc.); verify the privacy communication request based on the public cryptographic parameter and the digital authentication (e.g., validate/verify a digital signature of the component/extension/plug-in/app, etc.); generate, if the privacy communication request is verified, a first tagged privacy communication string (e.g., a 16 digit PAN), a second tagged privacy communication string shorter than the first tagged privacy communication string (e.g., a 4 digit expiry), and a tagged privacy communication string record in response to the privacy communication request, the privacy communication string record including the at least one first property of the provider server; transmit to the privacy component, over the first communication network, the first tagged privacy communication string and the second tagged privacy communication string, the first tagged privacy communication string and the second tagged privacy communication string configured to be provided to the provider server as part of a secure communication exchange (e.g., in the card number/expiration date fields, some embodiments can include additional strings, such as CVV, name, bill address, etc., which may include codes and/or be configured for further authentication); receive over a second communication network, a secure communication exchange approval request from a third server (e.g., a server associated with a payment network, issuer, etc.), the secure communication exchange approval request including an alpha string (e.g., card number), a beta string (e.g., expiry), and at least one provider property (e.g., card acceptor name/location, etc.); analyze the secure communication exchange approval request and the tagged privacy communication string record to determine: (a) if the alpha string matches the first tagged privacy communication string, (b) if the beta string matches the second tagged privacy communication string, and (c) a validity metric for the secure communication exchange approval request, the validity metric determination based on an analysis on the at least one provider property and the at least one first property of the provider server; generate a validation of the secure communication exchange approval request if: (A) the alpha string matches the first tagged privacy communication string, (B) the beta string matches the second tagged privacy communication string, and (C) the validity metric meets a specified threshold; and transmit to the third server, over the second communication network, the validation of the secure communication exchange approval request, the validation configured to complete a data exchange (e.g., payment, transaction, etc.) between the user compute device and the provider server.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments can be performed in any order. Words such as "then," "next," etc. are not intended to limit the order of the steps; these words are simply used to guide the reader through the description of the example methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description herein.

When implemented in software, the functions can be stored as one or more instructions or code on a non-transitory computer-readable or processor-readable storage medium. The elements or steps of a method or algorithm disclosed herein can be embodied in a processor-executable software module, which can reside on a computer-readable or processor-readable storage medium. A non-transitory computer-readable or processor-readable media includes both computer storage media and tangible storage media that facilitate transfer of a computer program from one place to another. A non-transitory processor-readable storage media can be any available media that can be accessed by a computer. By way of example, and not limitation, such non-transitory processor-readable media can comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be illustrative examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments (e.g., of designing and/or operating transparent displays) may be implemented using hardware, software, or a combination thereof. When implemented in software, the software code can be executed on any suitable processor or collection of processors, whether provided in a single computer or distributed among multiple computers.

Further, it should be appreciated that the present displays and methods of making and operating displays may be used in conjunction with a computer, which may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices, including one or more displays as disclosed herein. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program components and/or modules, executed by one or more computers or other devices. Generally, program components and/or modules include routines, programs, objects, elements, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various disclosed concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

A flow diagram is used herein. The use of flow diagrams is not meant to be limiting with respect to the order of operations performed. The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedia components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable and/or physically interacting components and/or wirelessly interactable and/or wirelessly interacting components and/or logically interacting and/or logically interactable components.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising, by a privacy component application configured to communicate with a first server of a privacy payment platform system associated with the privacy component application, when executed on a user device associated with a user:

detecting, by the privacy component application, based on one or more user operations associated with a merchant system, an initiation of a transaction associated with the user and the merchant system;

extracting, by the privacy component application, responsive to the detection of the initiation of the transaction, device data associated with the user device and server data associated with a second server, wherein the user device is configured to be in active communication with the second server, wherein the second server is associated with the merchant system;

generating, by the privacy component application, a privacy communication request comprising the device data and the server data associated with the second server;

transmitting, by the privacy component application, to the first server associated with the privacy payment platform system, via a communication network, the privacy communication request;

receiving, by the privacy component application, from the first server, via the communication network, a privacy communication string tagged to the second server, wherein the privacy communication string corresponds to a privacy communication string record associated with the first server, wherein the privacy communication string and the privacy communication string record are based on the privacy communication request, and wherein the privacy communication string record identifies the second server based on the server data;

transmitting, by the privacy component application, to the second server, the privacy communication string, wherein the privacy communication string is configured to be included in an approval request for a secure exchange, wherein the approval request further comprises identifying information associated with the second server, and wherein the approval request is associated with a card network; and receiving, by the privacy component application, from the second server, an indication corresponding to a successful approval request for the secure exchange, wherein the successful approval request is based on the second server identified in the privacy communication string record being the same as the second server associated with the identifying information in the approval request.

2. The method of claim 1, wherein the privacy communication request is associated with the transaction for an exchange of secure data between the user device and the second server.

3. The method of claim 2, wherein the privacy communication request further comprises transaction data associated with the exchange of secure data between the user device and the second server.

4. The method of claim 3, wherein the transaction data is configured to indicate that the privacy communication request is an authentic privacy communication request associated with the user device and the second server.

5. The method of claim 1, wherein the server data associated with the second server is configured to identify an entity associated with the second server.

6. The method of claim 5, wherein the server data comprises one or more server properties associated with the second server.

7. The method of claim 6, wherein the entity associated with the second server is determined to be a valid entity based on the server properties associated with the second server.

8. The method of claim 1, wherein the device data comprises device data associated with a location of the user device.

9. The method of claim 8, wherein the device data associated with a location of the user device is configured to indicate whether the location of the user device is greater than a specified distance from one or more previous locations of the user device transmitted in one or more previous communication requests, and wherein the location of the user device being greater than the specified distance causes the user device to receive a prompt to authenticate the privacy communication request.

10. The method of claim 1, wherein the privacy communication string is associated with a privacy payment card, and wherein the privacy communication string record identifies the second server as being associated with the privacy payment card.

11. The method of claim 10, wherein an external funding account is linked to the privacy payment card, and wherein the privacy payment card is configured to access the external funding account for payment transactions with the second server.

12. The method of claim 10, wherein the approval request for a secure exchange is for a payment transaction associated with the privacy payment card.

13. The method of claim 10, wherein the privacy communication string record further comprises one or more authorization parameters for the privacy payment card.

14. The method of claim 13, wherein one or more of the authorization parameters are specified in the privacy communication request.

15. The method of claim 14, wherein the authorization parameters are configured to determine at least in part whether the payment transaction should be authorized.

16. The method of claim 15, wherein the one or more authorization parameters specify one or more transaction thresholds for the privacy payment card.

17. The method of claim 16, wherein the transaction thresholds include one or more of a total number of authorized transactions, a total number of authorized transactions in a specified time period, a value for a single authorized transaction, a total value of all authorized transactions, and a total value of all authorized transactions over a specified time period.

18. The method of claim 1, further comprising:

receiving, by the privacy component application, from the first server, an indication that the approval request requires user input to authorize the approval request; and transmitting, from the privacy component application, user input authorizing the approval request, wherein the user input indicates that the requesting server matches the second server.

19. One or more computer-readable non-transitory storage media embodying software that is operable when executed by a processor to:

detect, by a privacy component application configured to communicate with a first server of a privacy payment platform system associated with the privacy component application when executed on a user device associated with a user, based on one or more user operations associated with a merchant system, an initiation of a transaction associated with the user and the merchant system;

extract, by the privacy component application, responsive to the detection of the initiation of the transaction, device data associated with the user device and server data associated with a second server, wherein the user device is configured to be in active communication with the second server, wherein the second server is associated with the merchant system;

generate, by the privacy component application, a privacy communication request comprising the device data and the server data associated with the second server;

transmit, by the privacy component application, to the first server associated with the privacy payment platform system, via a communication network, the privacy communication request;

receive, by the privacy component application, from the first server, via the communication network, a privacy communication string tagged to the second server, wherein the privacy communication string corresponds to a privacy communication string record associated with the first server, wherein the privacy communication string and the privacy communication string record are based on the privacy communication request, and wherein the privacy communication string record identifies the second server based on the server data;

transmit, by the privacy component application, to the second server, the privacy communication string, wherein the privacy communication string is configured to be included in an approval request for a secure exchange, wherein the approval request further comprises identifying information associated with the second server, and wherein the approval request is associated with a card network; and receive, by the privacy component application, from the second server, an indication corresponding to a successful approval request for the secure exchange, wherein the successful approval request is based on the second server identified in the privacy communication string record being the same as the second server associated with the identifying information in the approval request.

20. A system comprising: one or more processors associated with a user device; and a non-transitory memory coupled to the processors comprising instructions executable by the processors, the processors operable when executing the instructions to:

detect, by a privacy component application configured to communicate with a first server of a privacy payment platform system associated with the privacy component application when executed on a user device associated with a user, based on one or more user operations associated with a merchant system, an initiation of a transaction associated with the user and the merchant system;

extract, by the privacy component application, responsive to the detection of the initiation of the transaction, device data associated with the user device and server data associated with a second server, wherein the user device is configured to be in active communication with the second server, wherein the second server is associated with the merchant system;

generate, by the privacy component application, a privacy communication request comprising the device data and the server data associated with the second server;

transmit, by the privacy component application, to the first server associated with the privacy payment platform system, via a communication network, the privacy communication request;

receive, by the privacy component application, from the first server, via the communication network, a privacy communication string tagged to the second server, wherein the privacy communication string corresponds to a privacy communication string record associated with the first server, wherein the privacy communication string and the privacy communication string record are based on the privacy communication request, and wherein the privacy communication string record identifies the second server based on the server data;

transmit, by the privacy component application, to the second server, the privacy communication string, wherein the privacy communication string is configured to be included in an approval request for a secure exchange, wherein the approval request further comprises identifying information associated with the second server, and wherein the approval request is associated with a card network; and receive, by the privacy component application, from the second server, an indication corresponding to a successful approval request for the secure exchange, wherein the successful approval request is based on the second server identified in the privacy communication string record being the same as the second server associated with the identifying information in the approval request.

* * * * *